US008682461B2

(12) United States Patent
Nakayama

(10) Patent No.: US 8,682,461 B2
(45) Date of Patent: Mar. 25, 2014

(54) AUDIO SIGNAL PROCESSING SYSTEM

(75) Inventor: Kei Nakayama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 665 days.

(21) Appl. No.: 12/841,248

(22) Filed: Jul. 22, 2010

(65) Prior Publication Data

US 2011/0022205 A1 Jan. 27, 2011

(30) Foreign Application Priority Data

Jul. 22, 2009 (JP) ................................ 2009-171204
Jul. 22, 2009 (JP) ................................ 2009-171205

(51) Int. Cl.
*G06F 17/00* (2006.01)

(52) U.S. Cl.
USPC .............................. 700/94; 381/119; 375/356

(58) Field of Classification Search
USPC .............................................. 381/119; 369/4
See application file for complete search history.

(56) References Cited

U.S. PATENT DOCUMENTS

| | | | | |
|---|---|---|---|---|
| 4,625,283 | A | 11/1986 | Hurley | |
| 2003/0055518 | A1 * | 3/2003 | Aiso et al. | 700/94 |
| 2006/0064187 | A1 * | 3/2006 | Nishikori et al. | 700/94 |
| 2008/0232380 | A1 | 9/2008 | Nakayama | |
| 2008/0232525 | A1 * | 9/2008 | Nakayama et al. | 375/356 |
| 2010/0119085 | A1 * | 5/2010 | Shimizu et al. | 381/119 |

FOREIGN PATENT DOCUMENTS

| | | | |
|---|---|---|---|
| CN | 1409524 | A | 4/2003 |
| CN | 101146012 | A | 3/2008 |
| EP | 1 841 137 | A2 | 10/2007 |
| EP | 1 841 137 | A3 | 10/2007 |
| EP | 1 841 137 | B1 | 10/2007 |
| EP | 1 901 488 | A2 | 3/2008 |
| EP | 1 901 488 | A3 | 3/2008 |
| JP | 2003-101442 | | 4/2003 |
| JP | 2008-072347 | | 3/2008 |
| JP | 2008-072347 | A | 3/2008 |
| JP | 2008-288122 | * | 11/2008 |
| JP | 2010-114854 | A | 5/2010 |

OTHER PUBLICATIONS

Chinese Office Action and Search Report mailed Sep. 25, 2012, for CN Patent Application No. 201010236821.7, with English Translation, 12 pages.

(Continued)

*Primary Examiner* — Andrew C Flanders
*Assistant Examiner* — David Siegel
(74) *Attorney, Agent, or Firm* — Morrison & Foerster LLP

(57) ABSTRACT

Region having a same size in a audio signal region of a transmission frame is allocated to each of an active engine and passive engine. The active engine reads out input signals written into regions of the frame, performs signal processing on the read-out signals, and writes resultant signals into the region allocated to the active engine. The passive engine reads out the input signals written into the regions, performs the same signal processing as the active engine on the read-out signals, and writes resultant output signals into the region allocated to the passive engine. When a flag of the active engine is indicative of a normal state, an output device reads out the output signals from the region allocated to the active engine, but, when the flag is indicative of an abnormal state, the output device reads out the output signals from the region allocated to the passive engine.

10 Claims, 11 Drawing Sheets

(56) References Cited

OTHER PUBLICATIONS

Partial European Search Report mailed Feb. 15, 2012, for EP Patent Application No. 10170071.4, six pages.
"What is Cobranet™" with it's English translation and its related document: Peak Audio, "Peak Audio Licenses Its CobraNet Technology to Digigram," Jun. 12, 2001.
"EtherSound (Synoptic Document)" and its related document: Digigram, "EtherSound Technology: Overview," © Digigram 2008.
European Search Report mailed Jun. 8, 2012, for EP Patent Application No. 10170071.4, 11 pages.
European Communication mailed Jun. 3, 2013, for EP Patent Application No. 10170071.4, 15 pages.

* cited by examiner

AUDIO SIGNAL PROCESSING SYSTEM

BACKGROUND

The present invention relates to audio signal processing systems having a function of transmitting audio signals among a plurality of devices in substantially real time.

In the field of digital mixers, it is known to separately provide a console for operation by a human operator and an engine for performing signal processing, such as mixing processing and construct a mixing system by connecting the engine to the console. It is also known to connect two engines to such a mixing system to realize or implement mirroring of the engines (engine mirroring) and thereby construct a so-called fault-tolerant mixing system (see, for example, Japanese Patent Application Publication No. 2003-101442 which will hereinafter be referred to as "Patent Literature 1"). In such a fault-tolerant mixing system, one of the two engines is normally used as a main signal processing engine while the other engine is used as a backup engine. When abnormality has occurred to the engine being used (i.e., main signal processing engine), switching is made from the main signal processing engine to the backup engine. Such engine switching can be made both automatically and in response to an instruction given by a human operator.

Further, in the fields of WWW (World-Wide Web) servers, online systems and ordinary computer systems, such as routers, it is known to implement a fault-tolerant system. Among conventionally-known ways of implementing a fault-tolerant system in an ordinary computer system is one in which a main device for performing processing at normal times and another device for backing up the main device are provided so that the backup device takes over the operation or role of the main device when some abnormality has occurred to the main device.

Also, there have heretofore been known audio networks capable of transmitting audio signals (audio signals) among a plurality of devices (nodes) interconnected via a network. Examples of a technique for realizing such an audio network include CobraNet (registered trademark), EtherSound (registered trademark), etc. (see, for example, 1) "What's CobraNet™?" [online], BALCOM Co. Ltd. [searched on Jun. 23, 2009], Internet <URL: http://www.balcom.co.jp/cobranet.htm> (hereinafter referred to as "Non-patent Literature 1"); and 2) "EtherSound (outline)", [online], Bestec Audio Inc. [searched on Jun. 23, 2009], Internet <http://www.bestecaudio.com/download/EtherSound_Overview.pdf> (hereinafter referred to as "Non-patent Literature 2")).

Japanese Patent Application Publication No. 2008-072347 (hereinafter referred to as "Patent Literature 2"), for example, discloses a audio signal processing system in which a plurality of devices (nodes) are interconnected via network cables of the Ethernet (registered trademark) standard, and in which a "transmission frame" having audio signals put therein are transmitted among the plurality of notes by the "transmission frame" having the audio signals making a tour, per sampling period, through all of the nodes connected to the network. With the disclosed audio signal processing system having such an audio network technique applied thereto, audio signals of as many as hundreds of channels can be transmitted among the plurality of nodes in substantially real time by use of a plurality of transmission channels of the transmission frame. Further, with the transmission frame, the disclosed system can transmit control data etc. of the Ethernet (registered trademark) standard simultaneously with the audio signals.

Among possible embodiments of the aforementioned audio signal processing systems are, for example, large-scale mixing systems for use in concert venues, theaters, music production studios, public address systems and the like, intercommunication systems for communicating audio signals among communication units each including a microphone and audio system, effect impartment systems for imparting effects to audio signals of musical instrument performance tones and the like, plural-track recording/reproducing systems capable of simultaneously recording/reproducing a plurality of audio signals, etc.

However, with the fault-tolerant mixing system disclosed in Patent Literature 1, audio signal input and output devices have to be connected to the two engines via cables in the same wiring configuration; namely, audio signal transmitting wiring has to be physically dualized, which tends to make the wiring operation very cumbersome.

Further, there has been known no good method for effectively constructing a fault-tolerant system in the case where a audio signal processing system which transmits audio signals among a multiplicity of nodes as disclosed in Non-patent Literatures 1 and 2 is to be built. For example, even if the method presently used in ordinary network equipment, such as WWW servers, is applied to the audio signal processing system, a considerable time is required for causing the backup device to take over the operation of the main device where a trouble or abnormality has occurred, and thus, transmission of audio signals would be undesirably broken while the role of the main signal processing engine is switched to the backup engine.

Particularly, with audio signal processing systems for use in environments, such as music festival venues or various event venues, where music etc. are presented to a lot of audience, it is important that audio signals continue to be output with no substantive interruption or break, and thus, in order to effect mirroring of devices, such as engines, there is a need to allow a backup device to take over the operation of a main device with no substantive break in output audio signals (i.e., with no substantive sound break). However, where the conventionally-known mirroring technique is applied to such a audio signal processing system, it has not been possible to achieve a sufficient performance that can meet the need.

Furthermore, in a case where the audio signal processing system is used in an application, such as a public address system, vocal guidance system or intercommunication system, where there is not so great a need to continue outputting audio signals with no break, it is desirable to not waste audio signal transmitting bands (transmission channels) because the output audio signals may be interrupted for a certain time.

SUMMARY OF THE INVENTION

In view of the foregoing, it is an object of the present invention to provide an improved audio signal processing system which has a function of transmitting audio signals among a plurality of devices in substantially real time, and which, even when abnormality has occurred to any of the devices, can continue processing without involving a substantive interruption or break in output of audio signals.

It is another object of the present invention to provide a technique which can achieve mirroring of audio signal processing devices (engines) without wasting audio signal transmitting bands (transmission channels).

In order to accomplish the above-mentioned objects, the present invention provides an improved audio signal processing system, which includes a plurality of devices and an audio network interconnecting the plurality of devices and which, per predetermined period, circulates a transmission frame through the plurality of devices, the transmission frame having storage regions for storing therein various data to be communicated between the plurality of devices, each of the plurality of devices being capable of reading out data from some of the storage regions of the transmission frame or capable of writing data to some of the storage regions of the transmission frame, the plurality of devices including at least: an input device including an input section that inputs audio signals from outside, and an input signal write section that writes the audio signals, input via the input section, into a first storage region of the transmission frame as input signals to the audio signal processing system; a first signal processing device including a first readout section that reads out the input signals from the first storage region, a first signal processing section that performs signal processing on the input signals read out by the first readout section, a first output signal write section that writes the processed audio signals, from the first signal processing section, into a second storage region of the transmission frame as first output signals, and a first state data write section that writes first state data, indicative of whether or not the first signal processing device is in a normal state, into a third storage region of the transmission frame; a second signal processing device including a second readout section that reads out the input signals from the first storage region, a second signal processing section that performs same signal processing as the first signal processing section on the input signals read out by the second readout section, and a second output signal write section that writes the processed audio signals, from the second signal processing section, into a fourth storage region of the transmission frame as second output signals; and an output device including a first state data readout section that reads out the first state data from the third storage region, an output signal readout section that reads out the first output signals from the second storage region when the first state data read out by the first state data readout section is indicative of a normal state but reads out the second output signals from the fourth storage region when the read-out first state data is indicative of an abnormal state, and an output section that outputs the audio signals, read out by the output signal readout section, to outside.

The input device inputs a audio signal from outside and writes the input audio signals into the first storage region of the transmission frame by means of the input signal write section. The first signal processing device performs signal processing on the input signals, read out from the first storage region, by means of the first signal processing section, and writes the processed audio signals into the second storage region of the transmission frame by means of the first output signal write section. Further, the first signal processing device writes the first state data, indicative of whether or not the first signal processing device is in a normal state, into the third storage region of the transmission frame by means of the first state data write section. The second signal processing device performs the same signal processing as the first signal processing section on the input signals, read out from the first storage region, by means of the second signal processing section, to thereby generate the second output signals that is the same as the first output signals, and it writes the generated second output signals into the fourth storage region of the transmission frame by means of the second output signal write section. The output device can detect, on the basis of the first state data read out from the third storage region, whether the first signal processing device is in a normal state or in an abnormal state. When the first state data is indicative of a normal state when the first signal processing device is operating in a normal state), the output device reads out the first output signals from the second storage region of the transmission frame and outputs the read-out first output signals to outside by means of the output signal readout section and output section. Thus, the first signal processing device functions as an "active engine" that is a main signal processing engine, while the second signal processing device functions as a "passive engine" for backing up the "active engine". When the first state data is indicative of an abnormal state (i.e., when abnormality has occurred to the first signal processing device), on the other hand, the output device reads out the second output signal from the fourth storage region of the transmission frame and outputs the read-out second output signals to outside by means of the output signal readout section and output section. Thus, the second signal processing device functions as the "active engine" in place of the first signal processing device.

Preferably, in the audio signal processing system of the present invention, the second signal processing device further includes a second state data write section that writes second state data, indicative of whether or not the second signal processing device is in a normal state, into a fifth storage region of the transmission frame, and the output device further includes a second state data readout section that reads out the second state data from the fifth storage region. Thus, even when the first state data is indicative of an abnormal state, the output device does not output the second output signals to outside as long as the second state data read out from the fifth storage section is indicative of an abnormal state.

According to another aspect of the present invention, there is provided an improved audio signal processing system, which includes a plurality of devices and an audio network interconnecting the plurality of devices and which, per predetermined period, circulates a transmission frame through the plurality of devices, the transmission frame having storage regions for storing therein various data to be communicated between the plurality of devices, each of the plurality of devices being capable of reading out data from some of the storage regions of the transmission frame or capable of writing data to some of the storage regions of the transmission frame, the plurality of devices including at least: an input device including an input section that inputs audio signals from outside, and an input signal write section that writes the audio signals, input via the input section, into a first storage region of the transmission frame as input signals to the audio signal processing system; a first signal processing device including a first readout section that reads out the input signals from the first storage region, a first signal processing section that performs signal processing on the input signals read out by the first readout section, and a first output signal write section that writes the processed audio signals, from the first signal processing section, into a second storage region of the transmission frame as first output signals; a second signal processing device including a second readout section that reads out the input signals from the first storage region, a second signal processing section that performs same signal processing as the first signal processing section on the input signals read out by the second readout section, and a second output signal write section that writes the processed audio signals, from the second signal processing section, into a third storage region of the transmission frame as a second output signals; a control device including an instruction input section operable by a human operator to input an instruction for switching between the first signal processing device and the second signal processing device, and a switching instruction write section that writes, into a fourth storage region of the transmission frame, a switching instruction corresponding to the instruction input via the instruction input section; and an output device including a switching instruction readout section that reads out the switching instruction from the fourth storage region, an output signal readout section that reads out the first output signals from the second storage region before the switching instruction readout section reads out the switching instruction but reads out the second output signals from the third storage region after the switching instruction readout section reads out the switching instruction, and an output section that outputs the audio signals, read out by the output signal readout section, to outside.

The human operator can input, via the control device, an instruction for switching between the signal processing devices, and a switching instruction corresponding to the instruction input by the human operator is transmitted at least to the output device. Then, when the switching instruction has not been given, the output device reads out and outputs the first output signals from the second storage region to outside by means of the output signal readout section and output section. But, when the switching instruction has been given, the output device reads out the second output signals from the third storage region and outputs the second output signals to outside when the switching instruction has been given.

According to the present invention, when the first state data is indicative of an abnormal state, the role of the main signal processing device can be switched from the first signal processing device to the second signal processing device (mirroring of the signal processing devices can be effected) by the output device merely switching the output signal readout source from the second storage region to the fourth storage region. Thus, the present invention can advantageously effect or implement the mirroring of the signal processing devices promptly with a simple process with almost no interruption or break in output signals from the output device (with a audio break of only several milliseconds or less) during the course of the signal processing device switching. Thus, the present invention is well suited for use in implementing the mirroring function in audio signal processing systems where output of audio signals is required to continue, such as mixing systems used in live performance venues.

Further, by the second signal processing device too being constructed to output second state data indicating its operating state, the second output signals can be prevented from being output to outside even when the first state data is indicative of an abnormal state, as long as the second state data read out from the fifth storage region is indicative of an abnormal state. Such an arrangement can prevent a non-normal audio signal from being output.

Furthermore, the first signal processing device can be switched to the second signal processing device in response to a switching instruction manually input by the human operator. In this case too, the present invention can advantageously effect or implement the mirroring of the signal processing devices promptly with a simple process with almost no interruption or break in output signals (with no substantive sound break).

According to still another aspect of the present invention, there is provided an improved audio signal processing system, which includes a plurality of devices and an audio network interconnecting the plurality of devices and which, per predetermined period, circulates a transmission frame through the plurality of devices, the transmission frame having storage regions for storing therein various data to be communicated between the plurality of devices, each of the plurality of devices being capable of reading out data from some of the storage regions of the transmission frame or capable of writing data to some of the storage regions of the transmission frame, the plurality of devices including at least: an input device including an input section that inputs audio signals from outside, and an input signal write section that writes the audio signals, input via the input section, into a first storage region of the transmission frame as input signals to the audio signal processing system; a first signal processing device including a first readout section that reads out the input signals from the first storage region, a first signal processing section that performs signal processing on the input signals read out by the first readout section, a first output signal write section that writes the processed audio signals, from the first signal processing section, into a second storage region of the transmission frame as first output signals, a first state data write section that writes first state data, indicative of whether or not the first signal processing device is in a normal state, into a third storage region of the transmission frame, and a control section that, when the first signal processing device is in an abnormal state, stops writing, into the second storage region, of the first output signals to release the second storage region; a second signal processing device including a second readout section that reads out the input signals from the first storage region, a second signal processing section that performs same signal processing as the first signal processing section on the input signals read out by the second readout section, a first state data readout section that reads out the first state data from the third storage region, and a second output signal write section that, when the first state data read out by the first state data readout section is indicative of an abnormal state, acquires the second storage region released by the control section and writes the processed audio signals, from the second signal processing section, into the acquired second storage region as second output signals; and an output device including an output signal readout section that reads out the first output signals or the second output signals from the second storage region, and an output section that outputs the audio signals, read out by the output signal readout section, to outside.

The input device inputs audio signals from outside and writes the input audio signals into the first storage region of the transmission frame by means of the input signal write section. The first signal processing device reads out the input signals from the first storage region, performs signal processing on the read-out input signals by means of the first signal processing section, and writes the processed audio signals into the second storage region of the transmission frame by means of the first output signals write section. Further, the first signal processing device writes the first state data, indicative of whether or not the first signal processing device is in a normal state, into the third storage region of the transmission frame by means of the first state data write section. The second signal processing device, on the other hand, reads out the input signals from the first storage region, performs the same signal processing as the first signal processing section on the input signals, read out from the first storage region, by means of the second signal processing section, to thereby generate the second output signals that is the same as the first output signals. However, as long as the first signal processing device is operating in a normal state, the second output signals is not output. When the first state data is indicative of a normal state (i.e., when the first signal processing device is operating in a normal state), the output device reads out the first output signals from the second storage region of the transmission frame and outputs the read-out first output signals to outside. Thus, the first signal processing device functions as an “active engine” that is a main signal processing engine, while the second signal processing device functions as a “passive engine” for backing up the “active engine”.

Once abnormality occurs to the operation of the first signal processing device, the first signal processing device stops writing, into the second storage region, of the first output signals to release the second storage region. Once the second signal processing device detects, by the first state data, abnormality of the first signal processing device, it acquires the second storage region released by the control section and writes, by means of the second signal processing section, the input signals, processed by the second signal processing section, into the acquired second storage region as a second output signals. Thus, once abnormality occurs to the operation of the first signal processing device, the output device reads out the second output signals from the second storage region of the transmission frame and outputs the read-out second output signals to outside. Thus, normally, the first signal processing device functions as an “active engine” that is a main signal processing engine, while the second signal processing device functions as a “passive engine” for backing up the “active engine”. Once abnormality occurs to the first signal processing device, the second signal processing device functions as the “active engine”, in place of the first signal processing device, in the aforementioned manner.

Preferably, in the audio signal processing system, the second signal processing device further includes a second state data write section that writes second state data, indicative of whether or not the second signal processing device is in a normal state, into the third storage region, and the output device further includes a state data readout section that reads out the first state data or the second state data from the third storage region. Thus, when any one of the first state data and the second state data is indicative of an abnormal state, the output device does not output either of the first and second output signals to outside.

The second signal processing device writes the second state data, indicative of its operating state, into the third storage region. The output device can detect respective states of the first and second processing devices in accordance with the first and second state data read out from the third storage region. Thus, the second output signals can be prevented from being output to outside even when the first signal processing device is operating in an abnormal state, as long as the second signal processing device too has abnormality.

In another embodiment, the second processing device further includes a second state data write section that writes second state data, indicative of whether or not the second signal processing device is in a normal state, into the third storage region, and the output device further includes a state data readout section that reads out the first state data from the third storage region and the second state data from the fourth storage region. When each of the first state data and the second state data is indicative of an abnormal state, the output device does not output either of the first and second output signals to outside.

The second state data indicative of a state of the second signal processing device is written into the fourth storage region different from the third storage region where is written the first state data indicative of a state of the first signal processing device. The output device reads out the first state data from the third storage region and the second state data from the fourth storage region. Even when the read-out first state data is indicative of an abnormal state, the output device does not output either of the first and second output signals, stored in the second storage region, to outside, as long as the second state data too is indicative of an abnormal state.

According to still another aspect of the present invention, there is provided an improved audio signal processing system which includes a plurality of devices and an audio network interconnecting the plurality of devices and which, per predetermined period, circulates a transmission frame through the plurality of devices, the transmission frame having storage regions for storing therein various data to be communicated between the plurality of devices, each of the plurality of devices being capable of reading out data from some of the storage regions of the transmission frame or capable of writing data to some of the storage regions of the transmission frame, the plurality of devices including at least: a control device including an instruction input section operable by a human operator to input an instruction for switching between signal processing devices, and a switching instruction write section that writes, into a first storage region of the transmission frame, an inhibiting instruction and an authorizing instruction in response to the instruction input via the instruction input section; an input device including an input section that inputs audio signals from outside, and an input signal write section that writes the audio signals, input via the input section, into a second storage region of the transmission frame as input signals to the audio signal processing system; a first signal processing device including a first readout section that reads out the input signals from the second storage region, a first signal processing section that performs signal processing on the input signals read out by the first readout section, a first output signal write section that writes the processed audio signals, from the first signal processing section, into a third storage region of the transmission frame as first output signals, an inhibiting instruction readout section that reads out the inhibiting instruction from the first storage region, and a control section that, when the inhibiting instruction readout section reads out the inhibiting instruction, stops writing, into the third storage region, of the first output signals to release the third storage region; a second signal processing device including a second readout section that reads out the input signals from the second storage region, a second signal processing section that performs same signal processing as the first signal processing section on the input signals read out by the second readout section, an authorizing instruction readout section that reads out the authorizing instruction from the first storage region, and a second output signal write section that, when the authorizing instruction readout section reads out the authorizing instruction, acquires the third storage region released by the control section and writes the processed audio signals, from the second signal processing section, into the acquired third storage region as second output signals; and an output device including an output signal readout section that reads out the first output signals or the second output signals from the third storage region, and an output section that outputs the audio signals, read out by the output signal readout section, to outside.

The human operator can input, via the control device, an instruction for switching between signal processing devices. In response to the switching instruction, the control device transmits the output-signal-write inhibiting instruction to the first signal processing device and transmits the output-signal-write authorizing instruction to the second signal processing device. When the inhibiting instruction has been given, the control section of the first signal processing device stops writing, into the third storage region, of the first output signals to release the third storage region. When the authorizing instruction has been given, the second signal processing device acquires the third storage region released by the control section and writes the second output signals into the acquired third storage region. When no switching instruction is given, the output device reads out the first output signals from the third storage region and outputs the read-out first output signals to outside. But, once a switching instruction is given, the output device reads out the second output signals from the third storage region and outputs the read-out second output signals to outside.

In a audio signal processing system according to still another aspect of the present invention, the second signal processing device further includes a state data write section that writes state data, indicative of whether the second signal processing device is in a normal state or in an abnormal state, into a fourth storage region of the transmission frame, and the control device further includes a state data readout section that reads out the state data from the fourth storage region. The switching instruction write section writes the inhibiting instruction and the authorizing instruction into the first storage region, in response to the instruction input via the instruction input section, when the state data is indicative of a normal state, but does not write the inhibiting instruction and the authorizing instruction, irrespective of the instruction input via the instruction input section, when the state data is indicative of an abnormal state.

In a audio signal processing system according to still another aspect of the present invention, the second signal processing device further includes a state data write section that writes state data, indicative of whether the second signal processing device is in a normal state or in an abnormal state, into a fourth storage region of the transmission frame, and the first signal processing device further includes a state data readout section that reads out the state data from the fourth storage region. When the inhibiting instruction readout section reads out the inhibiting instruction, the control section stops writing, into the third storage region, of the first output signals to release the third storage region if the read-out state data is indicative of a normal state. But, if the read-out state data is indicative of an abnormal state, the control section neither stops writing, into the third storage region, of the first output signals nor releases the third storage region, irrespective of the given inhibiting instruction.

In a audio signal processing system according to still another aspect of the present invention, when the state data of the second signal processing device is indicative of a normal state, the second output signal write section of the second signal processing device acquires the third storage region released by the control section in accordance with the given authorizing instruction and writes the processed audio signals, from the second signal processing section, into the acquired third storage region as second output signals. But, when the state data of the second signal processing device is indicative of an abnormal state, the second output signal write section of the second signal processing device neither acquires the third storage region nor writes the second output signals, irrespective of the authorizing instruction.

According to the present invention, when the first signal processing device is operating in an abnormal state, only the first signal processing device writes the first output signals into the second storage region of the transmission frame. Once abnormality occurs to the first signal processing device, the second signal processing device starts writing, into the second storage region, of the second output signals; thus, the present invention can implement the mirroring for switching the role of the main signal processing device from the first signal processing device to the second signal processing device. In implementing the mirroring using the two signal processing devices, the present invention uses the storage region for only one signal processing device to write the output signals, and thus the present invention can advantageously implement the mirroring of the signal processing devices without wasting the storage regions (transmission channels) of the transmission frame. The present invention arranged in the aforementioned manner is well suited for use in implementing the engine mirroring function in audio signal processing systems where interruption or break in audio signal output is tolerable, like those in public address systems, vocal guidance systems, intercommunication systems, etc.

By the second signal processing device too being constructed to output the second state data indicating its operating state, the second output signals can be prevented from being output to outside even when the first state data is indicative of an abnormal state, as long as the second state data read out from the fifth storage region is indicative of an abnormal state. Such an arrangement can prevent a non-normal audio signal from being output.

Furthermore, the first signal processing device can be switched to the second signal processing device in response to a switching instruction manually input by the human operator. In this case too, the present invention can advantageously implement the mirroring of the signal processing devices without wasting the storage regions (transmission channels) of the transmission frame.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION

The following describe a mixing system constructed as an embodiment of a audio signal processing system of the present invention.

<General Construction of the Mixing System>

Figure 1A:
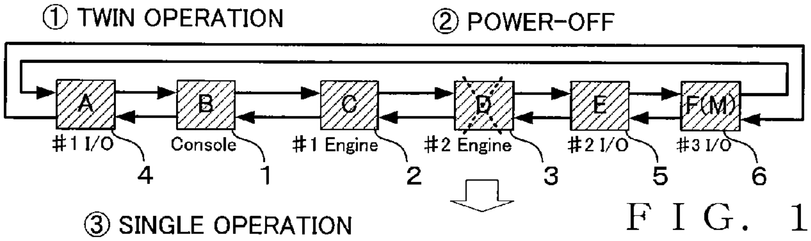
FIG. 1A is a block diagram showing an example construction of a mixing system that is an embodiment of a audio signal processing system of the present invention, which is explanatory of transmission paths in a “twin operation” mode.
Figure 1B:
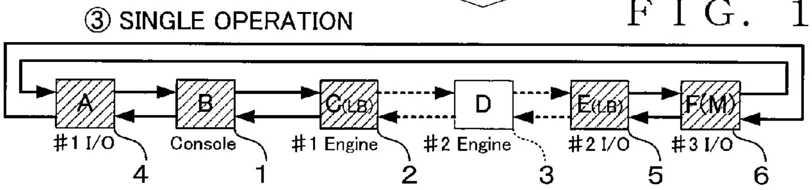
FIG. 1B is a diagram explanatory of transmission paths in a “single operation” mode.

FIGS. 1A and 1B are block diagrams explanatory of the mixing system. The mixing system shown in FIGS. 1A and 1B comprises a plurality of system constituent devices (nodes), and an audio network 7 interconnecting the system constituent devices (nodes). The plurality of system constituent devices include a mixing console (hereinafter also referred to as "device B") 1 operable by a human operator to perform various operation, a first mixing engine (hereinafter also referred to as "device C") 2 and second mixing engine (hereinafter also referred to as "device D") 13 which perform signal processing, such as mixing processing, on audio signals (sound signals), and audio signal input/output devices (I/O devices) (hereinafter also referred to as "device A", "device E" and "device F') 4-6 which input audio signals from outside of the mixing system and output audio signal to outside of the mixing system.

The plurality of devices 1-6 constituting the mixing system cooperate to perform mixing-related signal processing on audio signals. Namely, the console 1 functions as a control device which controls overall operation of the entire system and remote-controls the individual devices. More specifically, the console 1 transmits instructions, corresponding to operation received from the human operator, to the other devices 2-6 via the audio network 7 to control signal processing in the engines 2 and 3, performs path control for communication of audio signals among the aforementioned devices, and performs other control etc. The devices 2-6 operate on the basis of the instructions given from the console 1. The human operator can monitor, via the console 1, details of (such as values of parameters), of the signal processing being performed by the engines 2 and 3 and various data, such as input/output levels of audio signals in the I/O devices 4-6, among other things.

The audio network 7 is a ring-shaped network formed by sequentially interconnecting the devices 1-6 via network cables of the Ethernet (registered trademark) standard, and it can transmit various data, including audio signals of a plurality of channels, transmission frame by transmission frame, in accordance with the transmission scheme disclosed in Patent Literature 2 (Japanese Patent Application Publication No. 2008-072347).

Any one of the devices 1-6 connected to the audio network 7 is assigned as a master node, which, per predetermined sampling period, creates a "transmission frame" and transmits the created transmission frame to the network 7. In the illustrated example, "device F" indicated at reference character (M) (i.e., third I/O device 6) is assigned as the master node.

All of the other devices than the master node are assigned as slave nodes, and each of these slave nodes performs, on the basis of predetermined network clock pulses, a transfer process for transmitting a transmission frame to the audio network 7 while receiving the transmission frame from the audio network 7. Each transmission frame transmitted from the master node can make a tour through all of the devices 1-6, connected to the ring-shaped network 7, within one sampling period, by the size of the transmission frame being set appropriately on the basis of the sampling period, communication speed (transmission bandwidth) of the audio network 7 and other conditions. Thus, audio signals (waveform data) of a plurality of channels put in the transmission frame can be transmitted among the plurality of devices 1-6 in substantially real time.

Note that the master node functions not only as the device for creating the transmission frame but also as a word clock master for synchronizing sampling period timing at which the individual devices on the network 7 process waveform data. Each of the devices assigned as the salve node generates, in synchronism with the start of reception of one transmission frame, a word clock pulse that is a signal defining a sampling period for processing waveform data, to thereby synchronize its waveform data processing timing with a sampling period (word clock pulse) in the master node.

<Transmission Paths of Transmission Frames>

In FIG. 1A, arrows interconnecting the individual devices indicate transmission paths of transmission frames, and directions of the arrows indicate transfer directions of the transmission frames. Each of the devices 1-6 includes two sets of reception and transmission interfaces each for communication in a single direction, and a set of the reception interface and transmission interface of adjacent ones of the devices are interconnected via a network cable (or communication cable).

For example, between "device A" (I/O device 4) and "device B" (console 1), the reception interface of "device A" and the transmission interface of "device B" are interconnected via one communication cable, and the reception interface of "device B" and the transmission interface of "device A" are interconnected via another communication cable. Similarly, "device A" (I/O device 4) and "device F" (I/O device 6) indicated at opposite ends of a series of the devices 1-6 shown in FIG. 1A are interconnected via two communication cables. By sequentially interconnecting every adjoining two of the devices 1-6 in the aforementioned manner, two ring-shaped transmission paths extending in opposite directions are formed to allow transmission frames to be transferred in the opposite directions, as shown in FIG. 1A. Thus, one transmission frame created by the master node ("device F") circulates through all of the devices along one of the two transmission paths in the order of "Device F"→"Device A"→"Device B"→"Device C"→"Device D"→"Device E"→"Device F", and another transmission frame created by the master node ("device F") circulates through all of the devices along the other of the two transmission paths in the order of "Device F"→"Device E"→"Device D→"Device C"→"Device B"→"Device A"→"Device F". In this specification and drawings, operation in which transmission frames are transmitted along such dualized transmission paths will be referred to as "twin operation". As long as the mixing system is operating normally, it can operate in the "twin operation" mode (see "(1) Twin Operation" in FIG. 1A).

If any one of the devices (e.g., "device D") in the mixing system operating in the "Twin Operation" mode becomes no longer present on (i.e., no longer connected with) the network 7 due to powering-off, cut-off of the communication cable or some other reason ("(2) Power-off" in FIG. 1A), then the two ring-shaped transmission paths are cut at the position of the one device ("device D"). In such a case, "device C" and "device E" adjoining "device D" thus disconnected from the network 7 become new loop-back ends ("LBs") of the transmission paths, so that a ring-shaped transmission path is formed among the five devices, excluding "device D", with the new loop-back ends. In the thus-formed transmission path, a transmission frame created by the master node F circulates through the five devices in the order of "Device F"→"Device A"→"Device B"→"Device C"→"Device B"→"Device A"→"Device F"→"Device E"→"Device F" ("(3) Single Operation" in FIG. 1B).

Namely, even when part of the transmission paths in the twin operation mode has been cut at the position of any one of the devices (other than the master node device) in the instant embodiment of the mixing system, the embodiment can use the transmission paths in the single operation mode, to allows a transmission frame to circulate through the entire system. Thus, even when any one of the devices previously connected to the network 7 has become no longer present on (i.e., has disconnected from) the audio network 7, the other devices can continue their operation for transmitting a transmission frame in the entire system without the other devices being disconnected from the audio network 7.

<Mirroring of the Engines>

As further shown in FIG. 1A, the instant embodiment of the mixing system includes two engines, i.e. first mixing engine 2 and second mixing engine 3, and can operate in a mode where alternative switching can be made between the two engines (i.e., "engine mirroring" function). To permit the engine mirroring, the two engines 2 and 3 are set to perform the same mixing processing on the same audio signals, and any one of the two engines is assigned or set assigned as an "active" (i.e., first signal processing device) that is used as a main signal processing engine in the mixing system, while the other engine is set as a "passive engine" that is used as a backup or standby engine (i.e., second signal processing device) and that is normally kept in a standby state without participating in the signal processing.

When, for example, abnormality has occurred to the operation of the "active engine", the engine mirroring function allows the "passive engine" to be used as a new active engine, so that the new active engine can take over or continue the signal processing having so far been performed by the original active engine. Also, as set forth above, even when any one of the devices has become no longer present on the network, the entire system can continue its operation for transmitting a transmission frame in the single operation mode. Thus, even when the active engine has become no longer present on the network, the mixing system as a whole can not only continue its operation for transmitting a transmission frame but also continue the signal processing on audio signals.

In the instant embodiment of the mixing system, as set forth below, two operation modes, "FAST" mode and "ECONOMY" mode, can be set for the engine mirroring. The "FAST" mode is characterized by switching between the two engines without breaking or interrupting the output of audio signals from the I/O device 4, 5 or 6. Further, the "ECONOMY" mode is characterized by saving a quantity of audio signal storage regions (transmission channels) used in a transmission frame for the engine mirroring purpose.

<Construction of the Transmission Frame>

Figure 2:
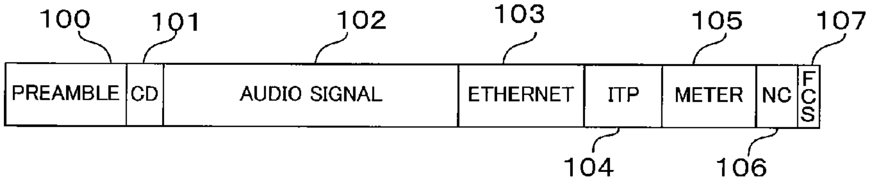
FIG. 2 is a diagram showing a construction of a transmission frame to be transmitted on an audio network of FIG. 1.

FIG. 2 shows a construction of a transmission frame to be transmitted on the audio network 7. The transmission frame includes a plurality of storage regions for storing various data, such as audio signals. More specifically, the transmission frame includes, sequentially from its front onward, a preamble 100, a management data (hereinafter referred to as "CD") storage region 101, a audio signal region 102 capable of storing therein audio signals of a plurality of channels, an Ethernet (registered trademark) data region 103, an ITP region 104, a meter region 105, an NC region 106, and a frame check sequence (FCS) region 107 for storing an error check code of the transmission frame. Note that sizes of the individual regions (i.e., band widths) shown in FIG. 2 are just illustrative examples, and sizes of the individual regions shown in FIG. 2 do not necessarily correspond to quantities of data stored in the regions.

In the preamble 100 are stored not only a preamble defined by the IEEE (Institute of Electrical and Electronic Engineers) 802.3, but also an SFD (Start Frame Delimiter) etc. According to the present invention, routing of each transmission frame in the system is implemented through physical connections between the devices via the cables, rather than addresses of the devices, and thus, "transmission destination addresses" of the transmission frames are unnecessary. Further, because each transmission frame has a predetermined fixed size, "data size" information is also not necessary. In the CD storage region 101 are stored data, such as a frame number assigned to the transmission frame and a sample delay value, which are to be used for managing data contained in the transmission frame. In the instant embodiment, later-described OSF flags (first and second state data) are written in the CD storage region 101.

The audio signal region 102, which is a region to be used for transmission of audio signals, has a predetermined plurality of (e.g., 256) transmission channels. Each of the transmission channels is capable of storing a digital audio signal (waveform data) of one channel sampled at a predetermined sampling frequency. The individual transmission channels are sequentially assigned serial numbers in a predetermined order from the leading end of the audio signal region 102. To each of the devices connected to the network 7 are allocated in advance one or more transmission channels into which that device writes audio signals. Allocation of the transmission channels of the audio signal region 102 to the individual devices will be described later.

The Ethernet (registered trademark) data region 103, ITP region 104, meter region 105 and NC region 106 are regions for storing data other than audio signals which are communicated among the devices 1-6 via the audio network 7. A normal Ethernet (registered trademark) frame is transmitted via the Ethernet (registered trademark) region 103. The normal Ethernet (registered trademark) frame includes, following the above-mentioned preamble and SFD, a transmission destination address, transmission source address, data size information and then data of a variable length, and it ends with an error checking FCS. The transmission destination address and transmission source address are MAC (Media Access Control) addresses specific to a network I/O of each of the devices. A broadcast address that addresses all of the devices on the network 7 may be designated as the transmission destination address. In the instant mixing system, all of various control data to be transmitted for one device to remote-monitor or remote-control another device are transmitted in an Ethernet (registered trademark) frame. In the Ethernet (registered trademark) region 103 are stored various control data (Ethernet (registered trademark) data), such as remote-controlling data transmitted from the console 1. As well known, when data of a size greater than a data size capable of being written into the Ethernet (registered trademark) region 103 of one transmission frame are to be transmitted, the transmitting device transmits the data after dividing the data into a plurality of partial data each having a size equal to or smaller than the above-mentioned data size capable of being written into the Ethernet (registered trademark) region 103 of one transmission frame, and the receiving device combines the plurality of partial data in a predetermined order to restore the original data. The meter region 105 stores therein level display meter data for displaying, on the console (console device) 1, input/output sound volume levels of individual audio signals in the individual devices. Further, the NC region 106 stores therein data indicative of a construction of the audio network 7.

The FCS region 107 is a region that stores therein an error check code defined by the IEEE 802.3 for detecting an error in the transmission frame. The reason why the meter region 105 for storing therein the level display meter data and the NC region 106 for storing therein data indicative of the construction of the audio network 7 are provided is to constantly transmit those data. Details of a network technique using the aforementioned transmission frame are disclosed in Japanese Patent Application Publication No. 2009-094587.

<Hardware Constructions of the Individual Devices>

Figure 3A:
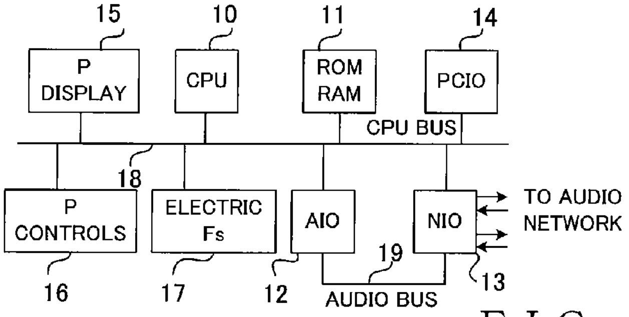
FIG. 3A is a block diagram showing an electric hardware construction of a console constituting the mixing system.
Figure 3B:
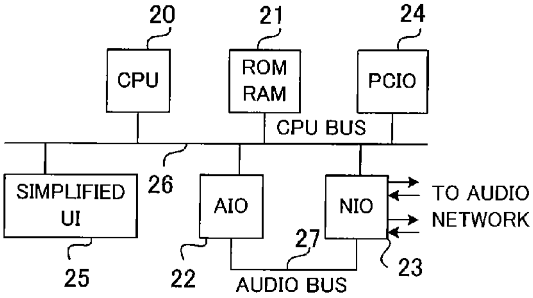
FIG. 3B is a block diagram showing an electric hardware construction of an I/O device constituting the mixing system.
Figure 3C:
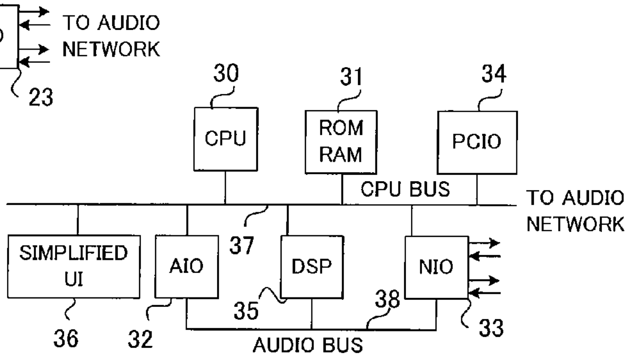
FIG. 3C is a block diagram showing an electric hardware construction of first and second engines constituting the mixing system.

FIGS. 3A-3C are block diagrams explanatory of hardware constructions of the individual devices constituting the mixing system. More specifically, FIG. 3A shows the hardware construction of the console 1, FIG. 3B shows the hardware construction of the I/O devices 4-6, and FIG. 3C shows the hardware construction of the first engine 2 and second engine 3.

<Construction Common to the Individual Devices>

In FIGS. 3A-3C, a CPU 10, 20 or 30, a memory 11, 21 or 31 including a ROM (Read-Only Memory) and RAM (Random Access Memory), an audio signal interface (hereinafter referred to as "audio I/O" and shown in the figures as "AIO") 12, 22 or 32, a network interface (hereinafter referred to as "network I/O" and shown in the figures as "NIO") 13, 23 or 33, and a computer interface (shown in the figures as "PCIO") 14, 24 or 34 are components employed in each of the devices 1-6 (i.e., components common to the devices 1-6). In each of the devices 1-6, the individual components are connected to the CPU 10, 20 or 30 via a CPU bus 18, 26 or 37, and the CPU 10, 20 or 30 controls overall behavior of the device by executing control programs stored in the ROM of the memory 11, 21 or 31 and on the basis of various setting data and various parameters stored in the memory 11, 21 or 31.

Further, in each of the devices 1-6, the audio I/O 12, 22 or 32 is an interface that functions as an input means for inputting analog or digital audio signals from an input source externally connected to the device or as an output means for outputting analog or digital audio signals to an output source externally connected to the device. The input source is some form of device, such as a musical instrument or music reproduction (play) device, which supplies input signals (audio signals) to the mixing system. The output destination is some of device, such as an amplifier, recording device or monitoring headphone, which functions as an output destination of output signals (audio signals) of the mixing system. The audio I/Os 12, 22 and 32 will be described in greater detail later with reference to FIG. 3B.

Further, in each of the devices 1-6, the network interface 13, 23 or 33 is an interface that connects the device in question to the audio network 7, and that has a transfer function of receiving a transmission frame from an upstream device on the transmission path and transmitting the received transmission frame to a downstream device on the transmission path. The network interface 13, 23 or 33 also functions as a read means for reading out various data, such as audio signals, from particular regions of the transmission frame and as a write means for writing various data, such as audio signals, into particular regions of the transmission frame. More details of the network interface 13, 23 or 33 will be discussed with reference to FIG. 4.

Furthermore, in each of the devices 1-6, the audio I/O 12, 22 or 32 and the network interface 13, 23 or 33 are interconnected via an audio bus 19, 27 or 38, so that digital audio signals (waveform data) of a plurality of channels can be transmitted between the audio I/O 12, 22 or 32 and the network interface 13, 23 or 33 time-divisionally, sample by sample, at timing based on the sampling period, in parallel with which an Ethernet (registered trademark) frame can be transmitted. Note that the audio I/O and the network I/O are synchronized in sampling period timing at which to process waveform data. Namely, any one of the audio I/O and network I/O is set as a word clock master while the other of the audio I/O and network I/O is set as a slave, so that the slave generates word clock pulses at timing synchronized to word clock pulses generated by the master and performs waveform data at sampling period timing based on the word clock pulses.

Furthermore, in each of the devices, the computer interface 14, 24 or 34 is an ordinary interface of the Ethernet (registered trademark) standard for connecting a personal computer (PC) to the device. The PC externally connected to the device via the PC interface 14, 24 or 34 can communicate an Ethernet (registered trademark) frame not only with the device to which the PC is connected directly but also with another one of the devices via the audio network 7 to which the device in question is connected, and the PC functions as a control device (similar to the console 1) for remote-controlling each of the devices 1-6 in the mixing system.

<Construction of the Console>

As shown in FIG. 3A, the console 1 includes, on an operation panel, a display section ("P display") 15, panel controls ("P controls") 16 for various operation by the human operator, and level adjusting controls ("electric Fs") 17 for adjusting sound volume levels of audio signals of individual channels. The display section 15 is, for example, in the form of a liquid crystal display and displays various information on the basis of display control signals given from the CPU 10 via the CPU bus 18. The panel controls 16 are a multiplicity of controls provided on the operation panel. Further, the sound volume level adjusting controls 17 are controls operable for adjusting sound volumes of audio signals, and operating positions of their knob portions are electrically controlled on the basis of drive signals given from the CPU10.

The human operator can use the display section 15, panel controls 16 and sound volume level adjusting controls 17 of the console 1 to perform various operation, such as ones for setting values of various parameters pertaining to the signal processing to be performed by the engines 2 and 3, for setting later-described engine mirroring and for instructing switching between the engines. Detection signals corresponding to human operator's operation of the panel controls 16 etc. are supplied to the CPU 10. On the basis of the supplied control signals, the CPU 1 generates control data for not only controlling behavior of the console 1 but also remote-controlling the other devices. The control data generated by the CPU 10 are supplied to the network I/O 13 via the CPU bus 18 and written into a transmission frame in the network I/O 13.

<Construction of the I/O Device>

In the I/O device of FIG. 3B, the audio I/O 22 has a function of at least any one of an analog input section for inputting analog audio signals, an analog output section for outputting analog audio signals and a digital input/output section for inputting and outputting digital audio signals (waveform data). The audio I/O 22 may comprise I/O card attaching slots and card-type devices attached to the I/O card attaching slots. The human operator can change, as desired, the construction of the audio I/O 22 within certain limits, such as the number of the I/O card attaching slots.

The analog input section includes, for example, a plurality of analog input terminals, such as XLR terminals and phone terminals, and an A/D conversion circuit, and, per sampling period, it converts analog audio signals of a plurality of channels, supplied from input sources connected to the input terminals, into digital audio signals (waveform data) and outputs the thus-converted digital audio signals (waveform data) to the audio bus 27.

The analog output section includes, for example, a plurality of analog output terminals, such as XLR terminals and phone terminals, and a D/A conversion circuit, and, per sampling period, it converts digital audio signals (waveform data) of a plurality of channels, supplied via the audio bus 27, into analog audio signals and outputs the thus-converted analog audio signals to output destinations connected to the output terminals.

The digital input/output section includes a plurality of digital audio terminals, such as AES/EBU terminals and ADAT (registered trademark) terminals, and per sampling period, it inputs waveform data from input sources connected to the digital audio terminals or outputs waveform data to output destinations connected to the digital audio terminals.

Further, as shown in FIG. 3B, the I/O device includes a simplified user interface (simplified UI) 25. The simplified UI 25 is a simple user interface including a power switch, operation-checking LED indicators, etc.

<Construction of the Engine>

As shown in FIG. 3C, each of the engines 2 and 3 includes a signal processing (DSP (Digital Signal Processor)) section 35 that performs signal processing on audio signals. The DSP section 35 may include only one such DSP, or a plurality of DSPs interconnected via a bus so that the signal processing can be performed distributedly by the plurality of DSPs. The DSP section 35 is connected to the audio I/O 32 and network I/O 33 via the audio bus 38, so that waveform data of a plurality of channels can be communicated (transmitted and received), per sampling period, between the DSP section 35 and the audio I/O 32 and network I/O 33.

To the DSP section 35 are supplied, per sampling period, waveform data (audio signals) of a plurality of channels input from the network I/O 33 and audio I/O 32 via the audio bus 38, as well as control data from the CPU 30 via the CPU bus 37. The control data are data that correspond to mixing-processing-related operation performed by the human operator on the console 1, and that are supplied to the DSP section 35 from the console 1 via the audio network 7. Per sampling period, the DSP section 35 executes processing based on various microprograms and thereby performs signal processing, corresponding to a parameter value that corresponds to operation performed by the human operator on the console 1, on the waveform data of the plurality of channels acquired via the audio bus 38. The waveform data of the plurality of channels having been subjected to the signal processing by the DSP section 35 are supplied, per sampling period, to the network I/O 33 or audio I/O 32 via the audio bus 38.

As further shown in FIG. 3C, each of the engines 2 and 3 includes a simplified user interface (simplified UI) 36. The simplified UI 36 is a simple user interface including a power switch, operation-checking LED indicators, etc.

<Construction of the Network I/O>

Figure 4:
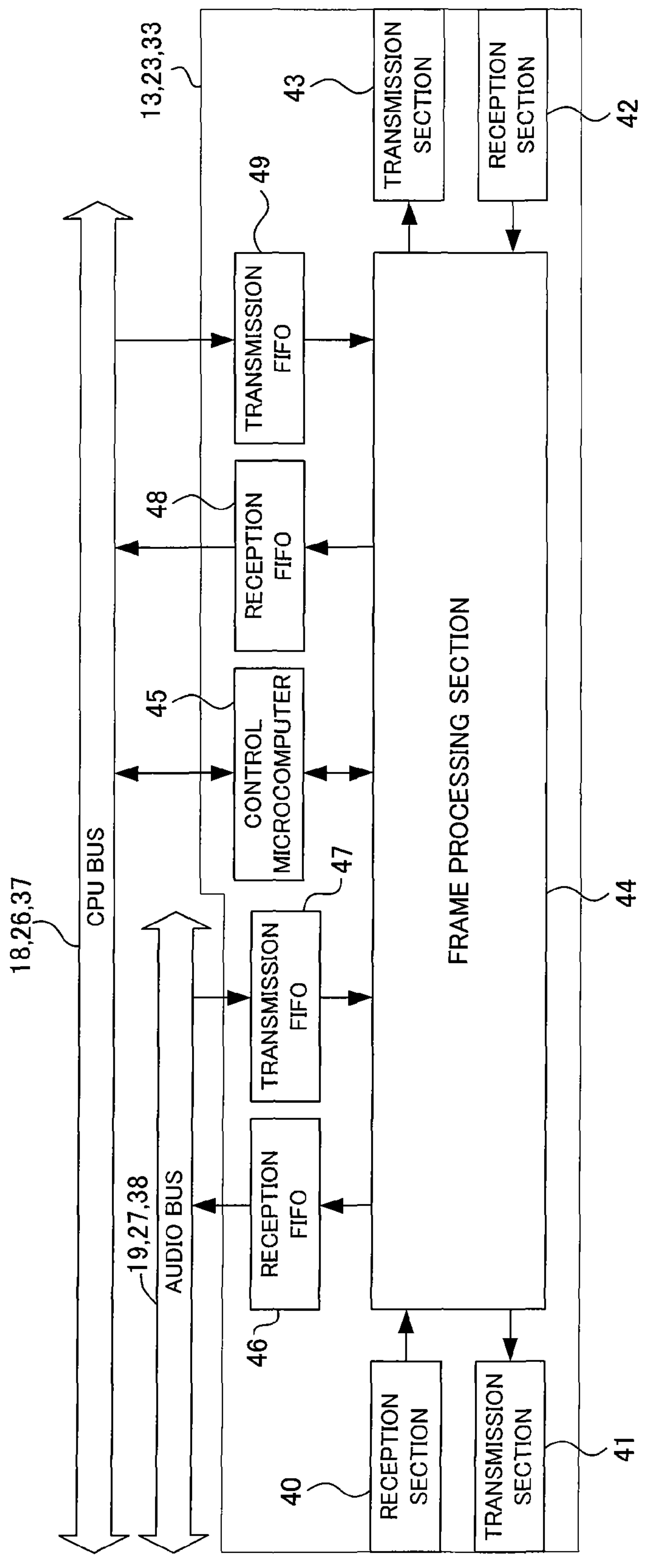
FIG. 4 is a block diagram showing an electric hardware construction of a network I/O provided in each of the devices of the mixing system.

FIG. 4 is a block diagram showing an example electric hardware construction of the network interface 13, 23 or 33 provided in each of the console 1, engines 2 and 3 and I/O devices 4-6. As shown in FIG. 4, each of the network interfaces 13, 23 and 33 includes a set of first reception and transmission sections 40 and 41, a set of second reception and transmission sections 42 and 43, a frame processing section 44, a controlling microcomputer (hereinafter referred to as "control microcomputer") 45, an audio signal reception FIFO 46 and audio signal transmission FIFO 47 connected to the audio bus 19, 27 or 38, and a control data reception FIFO 48 and control data transmission FIFO 49 connected to the CPU bus 18, 26 or 37.

The control microcomputer 45, which is a microcomputer including a CPU, ROM and RAM, is communicatively connected to the frame processing section 44 and the CPU bus 18, 26 or 37 for data communication therewith. The CPU of the control microcomputer 45 executes control programs, stored in the ROM or RAM, to control overall operation of the network I/O. Further, the control microcomputer 45 monitors operation of the main CPU 10, 20 or 30 of the device connected with the control microcomputer 45 via the CPU bus 18, 26 or 37, so that, when abnormality has occurred to the main CPU 10, 20 or 30, it can inform the other devices on the network 7 of the abnormality.

The set of the first reception and transmission sections 40 and 41 are connected, via the network cables, to one of the devices which adjoins the device in question, and the set of the second reception and transmission sections 42 and 43 are connected, via the network cables, to another one of the devices which adjoins the device in question (see FIG. 1A). On the basis of network clock pulses extracted from an electric signal or optical signal propagated over the network cable, each of the reception sections 40 and 42 demodulates digital data from the electric signal or optical signal, so that data constituting a transmission frame, transmitted from the device located upstream on the transmission path, are sequentially supplied to the frame processing section 44. Further, each of the transmission sections 41 and 43 modulates digital data, supplied from the frame processing section 44, into an electric signal or optical signal using network clock pulses as a carrier and then outputs the modulated electric signal or optical signal to the network cable. Thus, data constituting a transmission frame are sequentially transmitted downstream on the transmission path.

A network physical layer of each of the reception sections 40 and 42 and transmission sections 41 and 43 may comprise an interface of any conventionally-known data communication scheme as long as it has frequency bands capable of transmitting a transmission frame of a predetermined size within one sampling period. For example, if the physical layer is of the well-known 1 Gbps Ethernet (registered trademark) standard, the above-mentioned capability requirement can be satisfied.

The frame processing section 44 outputs transmission frames, received via the reception sections 40 and 42, to the transmission sections 41 and 43 while performing processes for taking in data of the received transmission frames and writing data into the transmission frames. More specifically, the transmission frames, input from upstream on the respective transmission paths, pass through the frame processing section 44 and are then sequentially transferred via the transmission sections 41 and 43 to the downstream devices on the respective transmission paths. During the time the transmission frames are passing through the frame processing section 44, the processes for taking in data of the transmission frames and writing data into the transmission frames are performed by the frame processing section 44.

Basically, each transmission frame is transferred on any one of two paths: one path where the transmission frame received via the first reception section 40 is output from the second transmission section 43; and the other path where the transmission frame received via the second reception section 42 is output from the first transmission section 41. However, in the device that becomes a loop-back end on the transmission path in the "single operation" mode, each transmission frame is transferred on any one of two paths; one path where the transmission frame received via the first reception section 40 is output from the first transmission section 41; and the other path where the transmission frame received via the second reception section 42 is output from the second transmission section 43.

Each of the FIFOs 46-49, which is a First-In-First-Out buffer where data are sequentially read out in the order they were written, is used for temporarily storing data to be written into a transmission frame and data which the frame processing section 44 has taken in from a transmission frame.

The audio signal reception FIFO 46 is a buffer for storing digital audio signals (waveform data) of a plurality of channels taken in by the frame processing section 44 from a transmission frame. The waveform data of the plurality of channels thus stored in the audio signal reception FIFO 46 are supplied, per sampling period, to other components (such as the audio I/O and DSP) of the device in question via the audio bus 19, 27 or 38.

The audio signal transmission FIFO 47 is a buffer for storing waveform data of a plurality of channels to be written into a transmission frame. Such waveform data of a plurality of channels are supplied, per sampling period, to the audio signal transmission FIFO 47 via the audio bus 19, 27 or 38.

The control data reception FIFO 48 is a buffer for storing control data that are data taken in from the Ethernet (registered trademark) data region 103 of a transmission frame supplied per sampling period, or control data (Ethernet (registered trademark) frame) generated on the basis of the data taken in from the Ethernet (registered trademark) data region 103. The control data thus stored in the control data reception FIFO 48 are read out by the main CPU 10, 20 or 30 of the device in question via the CPU bus 18, 26 or 37 and then used for control of the entire system and the device in question.

The control data transmission FIFO 49 is a buffer for storing control data to be written into a transmission frame. More specifically, the main CPU 10, 20 or 30 of the device in question writes control data (Ethernet (registered trademark) frame) to be transmitted into the control data transmission FIFO 49 via the CPU bus 18, 26 or 37. Note that, not only when control data to be transmitted have occurred in the device in question but also when control data not addressed to the device in question (i.e., addressed to another one of the devices) have been received from a PC externally connected to the device in question, the main CPU 10, 20 or 30 writes the control data, as control data to be transmitted, into the control data transmission FIFO 49.

<Processing Performed by the Frame Processing Section>

Figure 5:
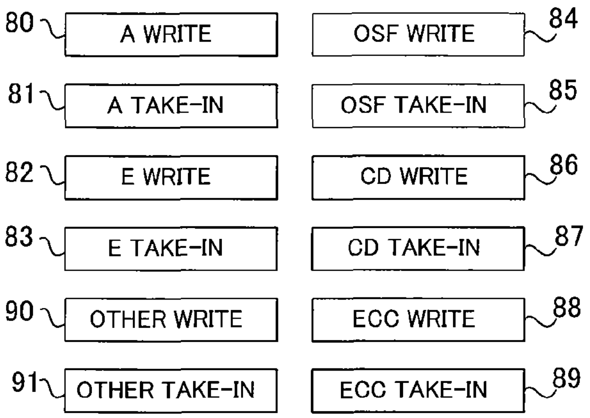
FIG. 5 is a block diagram explanatory of processing performed by a frame processing section shown in FIG. 4.

FIG. 5 is a block diagram explanatory of the processing performed by the frame processing section 44 for reading out and writing various data from and to a transmission frame as the transmission frame passes through the frame processing section 44. Blocks 80-91 represent individual data write and data readout operations. Namely, the frame processing section 44 performs the data write and data readout operations corresponding to the blocks 80-91; these data write and data readout operations corresponding to the blocks 80-91 are performed independently from one another.

"A Write Operation" 80 is a write operation for writing waveform data of a plurality of channels, stored in the audio signal transmission FIFO 47, into particular storage regions (transmission channels) of the audio signal region 102. The frame processing section 44 of each of the devices includes a plurality of transmission ports to which are assigned, in one-to-one corresponding relationship, a plurality of transmission channels secured or reserved by the device in question. In "A Write Operation" 80, at timing when the region of each individual one of the transmission channels (reserved by the device) of a transmission frame, supplied per sampling period, passes through the frame processing section 44, the frame processing section 44 writes waveform data, corresponding to the transmission port to which the transmission channel is assigned, into the region (transmission channel) in question to thereby update stored content of that region. In this way, each of the devices can transmit a transmission frame, having waveform data newly written therein, to the downstream adjoining device on the transmission frame.

"A Take-in Operation" 81 in FIG. 5 is an operation for taking in waveform data from the audio signal region 102 of a transmission frame and then storing the taken-in waveform data into the audio signal reception FIFO 46. The frame processing section 44 of each of the devices includes a plurality of reception ports for which are assigned, in one-to-one corresponding relationship, a plurality of receiving channels each indicative of a transmission channel for receiving waveform data. In "A Take-in Operation" 81, at timing when the region of each individual one of the transmission channels, indicated by the receiving channels, of a transmission frame, supplied per sampling period, passes through the frame processing section 44, the frame processing section 44 takes in waveform data from the region (transmission channel) in question and stores the taken-in waveform data into the audio signal reception FIFO 46. In this way, the frame processing section 44 can take in waveform data written by another device into the audio signal region 102.

"E Write Operation" 82 in FIG. 5 is an operation for writing control data (Ethernet (registered trademark) frame), accumulated in the control data transmission FIFO 49, into the Ethernet (registered trademark) data region 103 of a transmission frame. As noted above, the control data (Ethernet (registered trademark) frame) are remote-controlling data, information indicative of connecting states and operating states of each of the devices, etc. Transfer of the control data is managed in accordance with the "token passing" scheme, and what can write data into the Ethernet (registered trademark) region 103 of a transmission frame is only a device having a writing authorization or token in the network 7. Thus, the frame processing section 44 performs "E Write Operation" 82 after acquiring an authorization or token for writing control data into the Ethernet (registered trademark) data region 103. Further, if the size of the control data accumulated in the control data transmission FIFO 49 is greater than the size of data capable of being written into the Ethernet (registered trademark) data region 103 of one transmission frame (i.e., writable size), then the control data accumulated in the control data transmission FIFO 49 are written after being divided into a plurality of partial data each having a size equal to or smaller than the writable size.

"E Take-in Operation" 83 is an operation for forming control data on the basis of data taken in from the Ethernet (registered trademark) data region 103 of a transmission frame and then storing the thus-formed control data into the Ethernet (registered trademark) data reception FIFO 48. Through such "E Take-in Operation" 83, the frame processing section 44 of each of the devices takes in data from the Ethernet (registered trademark) data region 103 of a transmission frame, then forms control data by using the taken-in data as-is if the taken-in data are the whole of original control data or by combining partial data, sequentially supplied in a plurality of transmission frames, into the whole of original control data if the taken-in data are partial data of the original control data, and then performs error check based on an FCS (frame check sequence) included in the control data. If any error has been detected, the control data are discarded, while if no error has been detected, a determination is made as to whether a destination address of the control data is directed to the device in question or to a PC connected to the device in question. If it has been determined that the destination address of the control data is not directed to the device in question or to a PC connected to the device in question, the frame processing section 44 discards the control data, while, if it has been determined that the destination address of the control data is directed to the device in question or to a PC connected to the device in question, then the frame processing section 44 stores the control data into the control data reception FIFO 48 and then informs the main CPU 10, 20 or 30 of the device in question of the reception of the control data. The main CPU 10, 20 or 30, having been informed of the reception of the control data, reads out the control data from the control data reception FIFO 48. Namely, if it has been determined that the destination address of the control data is directed to the device in question, the main CPU 10, 20 or 30 controls the entire system or the device in question on the basis of the read-out control data, while, if it has been determined that the destination address of the control data is directed to a PC connected to the device in question, the main CPU 10, 20 or 30 transfers the read-out control to the PC.

"OSF Write Operation" 84 and "OSF Take-in Operation" 85 are write and take-in operations pertaining to OSFs (OSF is an acronym for Operation State Flag). The OSF flags are flags indicating, in binary values indicative of "normal state" and "abnormal states", operating states (i.e., first state data and second state data) of the engines 2 and 3 that are transmission sources of the flags. Each of the OSF flags is set at a value indicative of "abnormal state" when the operating state of the corresponding engine falls into later-described abnormality conditions, but otherwise set at a value indicative of "normal state".

"OSF Write Operation" 84 is an operation performed only by only the frame processing section 44 of each of the engines 2 and 3 for writing an OSF flag into the CD region 101 of a transmission frame. "OSF Take-in Operation" 85 is an operation performed by each of the devices, connected to the network 7, for taking in an OSF flag from the CD region 101. By taking in the OSF flag of the transmission frame, each of the devices, connected to the network 7, can determine whether the engine that is a transmission source of the OSF flag is in a normal or abnormal state.

Further, "CD Write Operation" 86 is an operation for writing data, other than the OSF flag, into the CD region 101 of a transmission frame. "CD take-in Operation" 87 is an operation for taking in data, other than the OSF flag, from the CD region 101 of a transmission frame. "ECC Write Operation" 88 is an operation for writing a transmission-frame error check code, currently output by the master node, into the FSC region 107 of the transmission frame. "ECC Take-in Operation" 89 is an operation for taking in an error check code from the FSC region 107 of a transmission frame. The frame processing section 44 of each of the slave nodes determines, on the basis of the taken-in error check code, whether or not the transmission frame is normal. If the transmission frame has any error, the frame processing section 44 discards the transmission frame.

For other data than the aforementioned, such as data of the ITP region, meter region and NC region, the frame processing section 44 of each of the devices performs write and readout operations similar to the aforementioned (see "Other Write Operation" 90 and "Other Take-in Operation" 91 in FIG. 5).

<Signal Processing Flows in the Mixing System>

Figure 6:
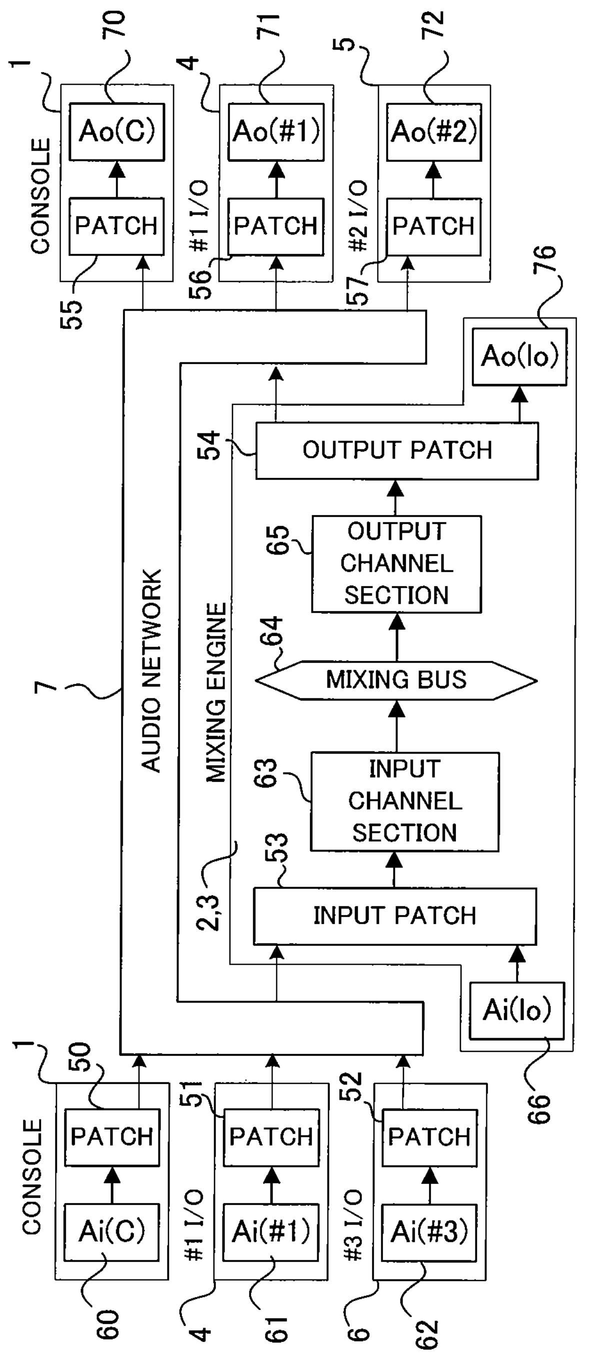
FIG. 6 is a block diagram explanatory of audio signal processing flows in the mixing system shown in FIG. 1.

FIG. 6 is a block diagram explanatory of signal processing flows in the mixing system shown in FIG. 1. In FIG. 6, the console 1 and the first and third I/O devices 4 and 6 are used as input devices for writing, into a transmission frame, external audio signals as input signals to the mixing system. Further, the console 1 and the first and second I/O devices 4 and 5 are used as output devices for taking in, from a transmission frame, audio signals (output signals) having been subjected to mixing processing by the engines 2 and 3, and then outputting the taken-in audio signals to outside of the mixing system. Further, the engines 2 and 3 too are used as input devices for inputting external input signals as input signals to the mixing system. Although the mixing system includes two mixing engines 2 and 3, only one of the engines is shown in FIG. 6 because only one of the engines (active engine) performs substantive signal processing.

In FIG. 6, broken-line arrows indicate flows of audio signals between the individual devices 1-6 and the audio network 7, and solid-line arrows indicate flows of audio signals via the audio buses 19, 27 and 38 within the individual devices. As noted above, the audio signal region 102 of a transmission frame has a predetermined plurality of (e.g., 256) transmission channels, so that audio signals of 256 channels can be simultaneously transferred via the audio network 7. Each of the devices 1-6 has one or more transmission channels exclusively reserved or secured therefore from among the 256 channels in advance (e.g., when the device is connected to the audio network 7), so that it can transmit audio signals onto the network 7 using the reserved transmission channels.

In the input devices 1, 4 and 6, audio input sections 60-62 ("Ai(c)", "Ai(#1)" and "Ai(#3)") correspond to the input functions of the audio I/Os 12 and 22, and external input sources are connected to individual input terminals of the audio input sections 60-62. The control device makes settings for allocating audio signals, input via a plurality of input terminals of the audio input sections 60-62, to transmission channels of a transmission frame. Basically, "Patch" means allocating an output destination to an input source of an audio signal to thereby set a path for delivering the audio signal of the input source to the output destination ("path setting"). Each output destination is allocatable to only one input source and cannot be allocated to two input sources at the same time. If an output destination has not be allocated to any input source, then a silent signal (zero-level signal) is output to that output destination. Further, a patch setting pertaining to a reception port includes a reception setting indicative of a transmission channel to be received by the reception port. By dynamically changing the number of the receiving channels to be received by the reception ports, it is possible to reduce the number of the reception ports required in the device in question. For the transmission ports, on the other hand, each of the devices is constructed to secure or reserve a plurality of transmission channels and statically set the reserved transmission channels as transmitting channels, and thus, the patch settings do not include any transmission setting that pertains to a transmission channel to be transmitted. Analog audio signals of a plurality of channels, externally input via a plurality of input terminals of the audio input section 60-62, are converted into digital audio signals (waveform data) per sampling period and then supplied, per sampling period, to a plurality of transmission ports of the network I/O 13 or 23 via the audio bus 19 or 27 on the basis of patch settings of the patch section 50-52. At that time, each of a plurality of transmission ports of the network I/O 13 or 23 performs writing into a plurality of transmission channels, reserved by the input device in question, of a transmission frame received per sampling period. Operation of the audio input sections 60-62 corresponds to an input means (section), and operation of the patch sections 50-52, including the network I/Os 13 and 23, corresponds to an input signal write means (section).

For the input patch section 53 of the mixing engine 2 or 3, the control device makes patch settings for allocating waveform data of transmission channels of a transmission frame to input channels of an input channel section 63 provided at a stage succeeding the input patch section 53. The patch settings include reception settings each indicative of a transmission channel to be received by the engine 2 or 3, and path settings each for supplying a signal of the received transmission channel (one reception port) to a desired input channel. In the case where the engine mirroring is to be effected, the input patch sections of the engines 2 and 3 allocate waveform data of the same transmission channel to corresponding channels (of the same channel number) of the engines 2 and 3. The network I/O 33 of each of the engines 2 and 3 takes in waveform data (input signals) of one or more channels, written by any of the input devices 1, 4 and 6, on the basis of reception settings of the input patch section 53 and supplies, per sampling period, the taken-in input signals of one or channels to a plurality of input channels of the input channel section 63, implemented within the DSP section 35, on the basis of path settings of the input patch section 53 and via the audio bus 38. The operation of the input patch sections 53, including the network I/Os 33 of the engines 2 and 3 correspond to first and second readout means (sections).

The input channel section 63 includes a plurality of signal processing channels (input channels), and, for each of the input channels, it performs signal processing, including level adjustment, equalizing and effect impartment, on input waveform data on the basis of various parameters for controlling a audio volume, frequency, effect, etc., and it outputs the processed audio signal to the mixing bus 64. The mixing bus 64 includes a plurality of bus lines, and, for each of the bus lines, it mixes waveform data of one or more channels supplied from the input channel section 63 and outputs a result of the mixing to an output channel section 65. The output channel section 65 includes a plurality of signal processing channels (output channels) corresponding to the bus lines of the mixing bus 64, and, for each of the output channels, it performs signal processing, such as level adjustment, on the waveform data output from the corresponding bus line on the basis of various parameters set by the control device for controlling a audio volume, frequency, effect, etc. The input channel section 63, mixing buses 64 and output channel section 65 are implemented through microprograms executed by the DSPs 35 (see FIG. 3C) of the engines 2 and 3. The operation of the DSP sections 35 (see FIG. 3C) of the engines 2 and 3 corresponds to first and second signal processing means (sections).

For the output patch section 54, the above-mentioned control device makes patch settings to allocate waveform data of the individual output channels of the output channel section 65. Waveform data (output signals) of the individual output channels, having been subjected to signal processing by the DSP 35, are supplied, per sampling period, to a plurality of transmission ports of the network I/O 33 on the basis of the patch settings of the output patch section 54 and via the audio bus 38. The plurality of transmission ports of the network I/O 33 write the supplied waveform data into corresponding particular regions (transmission channels set in the transmission ports) of the audio signal region 102 of a transmission frame received per sampling period. The operation of the output patch sections 54, including the network I/Os 33, of the engines 2 and 3 correspond to first and second output signal write means (sections). As described later, each of the engines 2 and 3 writes output signals into a transmission frame in a FAST mode, while only any one of the engines 2 and 3 writes output signals into a transmission frame in an ECONOMY mode.

Further, each of the engines 2 and 3 includes its own (local) audio input section 66 ("Ai(Lo)") and audio output section 76 ("Ao(Lo)"). The local audio input section 66 and local audio output section 76 correspond to the audio I/O 32 of FIG. 3C. Similarly to audio signals taken in from a transmission frame via the audio network 7, audio signals input via individual input terminals of the local audio input section 66 and converted into digital audio signals can be supplied to desired input channels of the input channels section 63 on the basis of patch settings of the input patch section 53. Further, similarly to audio signals written into a transmission frame, audio signals output from individual output channels of the output channel section 65 can be supplied to desired output terminals of the local audio output section 76 on the basis of path settings of the output patch section 54 after being converted into analog signals.

Further, for the patch section 55, 56 or 57 of each of the output devices 1, 4 and 5, the control device makes patch settings to connect waveform data of transmission channels of a transmission frame to a plurality of output terminals of an audio output section 70-72 provided at a stage succeeding the patch section 55, 56 or 57. The patch settings include reception settings indicative of transmission channels to be received by the output device 1, 4 or 5, and path settings each for supplying an audio signal of a received transmission channel (one reception port) to a desired output terminal. The audio output sections 70-72 ("Ao(c)", "Ao(#1)" and "Ao(#2) ") correspond to output functions of the audio I/Os 12 and 22 (a plurality of physical output terminals possessed by the audio I/Os), and the individual output terminals are connected to output destinations. The network I/O 13 or 23 of each of the output devices 1, 4 and 5 takes in, from a transmission frame received per sampling period, waveform data (output signals) of a plurality of channels, written by the engine 2 or 3, on the basis of the reception settings of the patch section 55-57. Then, the network I/O 13 or 23 supplies, per sampling period, the taken-in waveform data of the plurality of channels to a plurality of output terminals of the audio output section 70-72 via the audio bus 19 or 27 on the basis of path settings of the patch section 55-57. At the output terminals of the audio output section 70-72, the supplied waveform data of the plurality of channels are converted into analog audio signals and output per sampling period. The operation of the patch sections 55-57 including the networks I/O 13 and 23 correspond to an output signal readout means (section), and the operation of the audio output sections 70-72 corresponds to an output means (section).

The above-described construction may be summarized as follows. Each of the input devices 1, 4 and 6 writes audio signals of a plurality of channels, input from external input sources via the audio input section 60-62, into transmission channels of a transmission frame on the basis of patch settings of the patch section 50-52. Each of the engines 2 and 3 takes in the input signals of the plurality of transmission channels of the transmission frame on the basis of the patch settings of the input patch section 53, and then it performs signal processing, such as mixing processing, on the taken-in input signals by means of the input channel section 63, mixing bus 64 and output channel section 65 and writes the resultant processed signals (output signals) of the plurality of channels into transmission channels of the transmission frame on the basis of the patch settings of the output patch section 54. Further, each of the output devices 1, 4 and 5 takes in the output signals of the plurality of channels from the transmission frame and outputs the taken-in output signals to output destinations by means of the audio output section 70-73 on the basis of the patch settings of the patch section 55-57.

In a plurality of transmission ports of the network I/O of each of the devices 1-6, a plurality of transmission channels reserved by the device are statically set as transmission channels. Even when any of the transmission channels is not being actually used (namely, no transmission patch setting has been made to that transmission channel), a silent signal of a zero sound volume level (zero-level signal) is put in the transmission channel, so that the silent signal is transmitted to the audio network 7. As noted above, each of the patch sections 50-57 of FIG. 6 includes an input source (not shown) that supplies a zero-level signal to an output destination that has not been allocated to any input source.

<Patch Setting Via the Network>

In the instant mixing system, as set forth above, the engines 2 and 3 and all of the other devices have the patch sections 50-57. This is for the purpose of efficiently using the limited number of transmission channels to transmit audio signals from input sources to output destinations via the audio network 7. The human operator can make patch settings via the audio network 7 using the control device (console 1 or PC) and user interface. In patch setting operation via the audio network 7, the human operator only has to make a patch setting from an input source of one device to an output destination of another device (e.g., setting for connection between one input terminal of one of the input devices and one input channel of one of the engines); because allocation of transmission channels is automatically performed by the system, the human operator does not have to take the allocation of transmission channels into consideration. The following paragraphs brief an operational sequence for making patch settings via the network in relation to a case where an input source connected to one of the input devices is to be connected with an input channel of the engine.

(1) When a patch setting has been made, on the console (control device) 1, for allocating one input channel (i.e., output destination) of the engine 2 or 3 to an input terminal (i.e., input source) of one of the input devices, transmission connection data indicating that an audio signal from the input source should be transmitted to the input device having the input source. The transmission connection data include data identifying the input source of the audio signal. Further, in the each of the engines 2 and 3 having the input channel functioning as the other connecting party is set reception connection data indicating that the audio signal from the input source should be received and supplied to the one input channel. The reception connection data include data identifying not only the input source but also the input channel functioning as the other connecting party. Note that mirroring is effected between the two engines 2 and 3 in the instant embodiment, the same reception connection data is set in each of the engines 2 and 3.

(2) For the patch section 50-52 of any one of the input devices having input sources, the control device allocates an unused one of transmission channels, reserved by the input device in question, for transmission connection and makes a patch setting for allocating a transmission port of the allocated transmission channel to the input source identified by the transmission connection data, on the basis of the transmission connection set in the aforementioned manner. Thus, the signal of the identified input source is written into the one unused transmission channel of the transmission frame. Further, the input device in question informs all of the devices, connected to the audio network 7, a set of the input source and the channel number of the transmission channel to be written into by the transmission port allocated to the input source. In this way, all of the other devices can know the audio signal of which input source has been put in the transmission channel.

(3) For the patch section 53 of each of the engines 2 and 3 that is the other connecting party, the control device identifies the channel number of the transmission channel having the audio signal of the input source put therein, sets one reception port so as to receive the identified transmission channel and then makes a patch setting for allocating the input channel, specified by the reception connection data, to the reception port, on the basis of the setting of the reception connection and information (i.e., a set of pieces of information identifying the input source and the channel number of the transmission channel having the audio signal of the input source put therein) sent from the input device having the input source. Thus, the audio signal of the identified transmission channel is supplied to the specified input channel. Namely, the waveform data (audio signal) are taken in from the same transmission channel by the two engines 2 and 3, and the taken-in waveform data are supplied to corresponding input channels (i.e., input channels of the same channel number) of the engines 2 and 3.

Through operations (1) to (3) above, the audio signal input to the input device from the external input source is supplied to one input channel of each of the engines 2 and 3 via the audio network 7. An operational sequence for interconnecting, via the network 7, the output channels of each of the engines 2 and 3 and output destinations connected to the individual output terminals of each of the output devices 1, 4 and 5 may be understood from the above description about operations (1) to (3), in which case, however, each occurrence of the term "input source" of the input device should be read as "output channel" of the engine and each occurrence of the term "input channel" of the engine that is the other connecting party should be read as "output destination" of the output device. Similarly, an operational sequence for connecting, via the network 7, the input channels of each of the input devices to the individual output terminals of each of the output devices 1, 4 and 5 may be understood from the above description about operations (1) to (3), in which case, however, each occurrence of the term "input channel" of the engine that is the other connecting party should be read as "output destination" of the output device.

<FAST Mode>

Figure 7A:
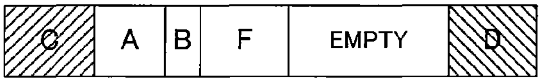
FIG. 7A is explanatory of characteristics of a FAST mode, which is particularly explanatory of example allocation, to the individual devices, of transmission channels of a audio signal region of a transmission frame.
Figure 7B:
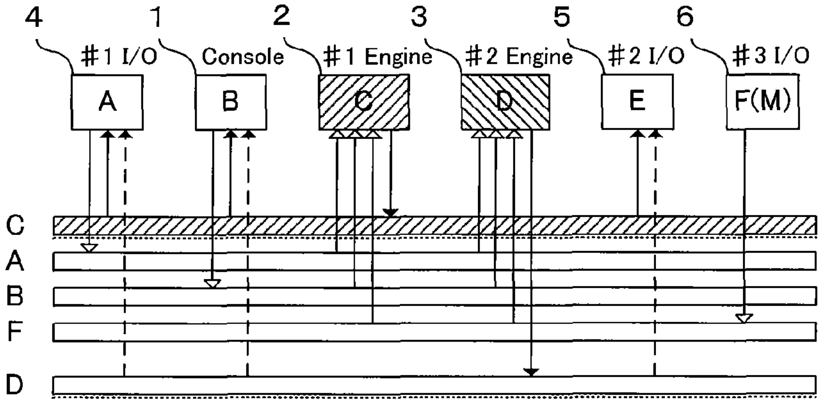
FIG. 7B is explanatory of characteristics of the FAST mode, which is particularly explanatory of how audio signals (waveform data) are input and output when an active engine is in a normal state.
Figure 7C:
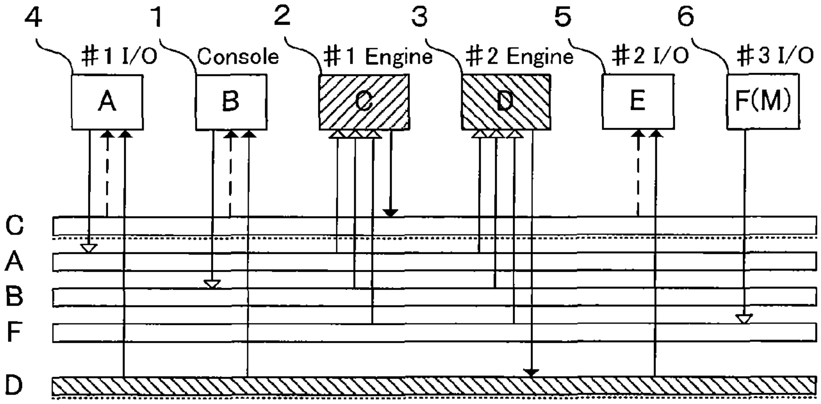
FIG. 7C is explanatory of characteristics of the FAST mode, which is particularly explanatory of how audio signals (waveform data) are input and output when the active engine is in an abnormal state.

FIGS. 7A to 7C are diagrams explanatory of characteristics of the "FAST mode". More specifically, FIG. 7A shows example allocation, to the individual devices, of the transmission channels of the audio signal region 102 of a transmission frame shown in FIG. 2, i.e. which devices have reserved which transmission channels. Alphabetical letters in FIGS. 7A to 7C correspond to the alphabetical letters used for the individual devices in FIG. 1. Further, FIGS. 7A to 7C assume a case where device "C" is the first engine 2 that is set to function as the "active engine" and device "D" is the second engine 3 that is set to function as the "passive engine".

In FIG. 7A, an area where the alphabetical letters are shown represents regions (storage regions) of the transmission channels allocated to the devices corresponding to the alphabetical letters. Each of the individual regions has a size or bandwidth corresponding to the number of transmission channels reserved by the device in question. The region indicated by "C" is a storage region allocated to device "C" (first engine 2). The regions indicated by "A", "B" and "F" are storage regions allocated to the device "A" (first I/O device 4), device "B" (console 1) and device "F" (third I/O device 6), respectively. These "C", "A", "B" and "F" regions are reserved successively from the leading end (left end in the figure) of the audio signal region 102. By contrast, storage the "D" region allocated to device "D" (second engine 3) is reserved in a trailing end (right end in the figure) of the audio signal region 102. A region having not been allocated to any one of the devices is left as an "empty region". Once any one of the devices requests the master node for one or more new transmission channels, the master node allocates part or whole of the empty region to the requesting device, so that the requesting device can secure or reserve the allocated region (one or more transmission channels). The reason why no region has been reserved for the device "E" (second I/O device) in FIG. 7A is that the device "E" assumes a system construction for use only as an output device (see FIG. 6).

In FIG. 7A, two regions "C" and "D", which have been reserved for the engines to effect the engine mirroring, are indicated by hatched lines. Where the engine mirroring is to be effected in the "FAST" mode, the active engine "C" and backup engine "D" are set to perform the same mixing processing on the same audio signals, so that the "C" region and "D" region, having the same size (the same number of transmission channels) are reserved for the active engine "C" and passive engine "D". Namely, in the "FAST" mode, extra transmission channels are used in the audio signal region 102 because of output signals of the passive engine that is not used substantively. However, by allocating in advance transmission channels to the passive engine as well, it is possible to promptly switch between the two engines without involving a substantive sound break or interruption when effecting the engine mirroring (i.e., switching from the active engine to the passive engine), as will be described later.

FIGS. 7B and 7C are diagrams explanatory of an example manner in which input and output states of audio signals between the devices 1-6 vary due to the engine mirroring function in the "FAST" mode. More specifically, FIG. 7B shows a state when the active engine "C" is operating normally (normal state), while FIG. 7C shows a state when the passive engine "D" has taken the place of the active engine "C" due to occurrence of abnormality to the active engine "C". In FIGS. 7B and 7C, horizontal bands C, A, B, F and D, extending generally parallel to a row of blocks 1-6 indicative of the devices "A" to "F", represent the "C", "A", "B", "F" and "D" regions (see FIG. 7A) of the audio signal region 102 which are allocated to the devices "C", "A", "B", "F" and "D". In the instant network, an audio signal written by any one of the devices into a transmission channel can be taken in by any of the other devices, and thus, the bands C, A, B, F and D, representing the "C", "A", "B", "F" and "D" regions, are each depicted in a length covering all of the devices "A" to "F".

<When the Active Engine is in a Normal State>

The input devices "A", "B" and "F" (i.e., first I/O device 4, console 1 and third I/O device 6) write audio signals input via a plurality of input terminals (input signals) into a plurality of transmission channels of the "A", "B" and "F" regions on the basis of the patch settings of their respective patch sections 50, 51 and 52 (as indicated by downward white-head arrows extending from the devices "A", "B" and "F" to the "A", "B" and "F" bands). Further, engines "C" and "D" (i.e., first and second engines 2 and 3) take in audio signals from a plurality of transmission channels of the "A", "B" and "F" regions via a plurality of reception ports and supply the taken-in audio signals to a plurality of input channels (as indicated by upward white-head arrows extending from the bands "A", "B" and "F" to the devices "C" and "D").

Engines "C" and "D" perform signal processing on the taken-in audio signals (input signals) by means of their respective DSP sections 35 and then write, on the basis of the patch settings of their respective output patch sections 54, the thus-processed audio signals of a plurality of output channels (output signals) into a plurality of transmission channels of the “C” and “D” regions allocated thereto. Because the active engine “C” and the passive engine “D” perform the same signal processing on the same audio signals, exactly the same audio signals are written into the “C” and “D” regions. Further, on the basis of the patch settings, the audio signals of the plurality of output channels are written into corresponding locations within the “C” and “D” regions. Therefore, in the “C” and “D” regions, the audio signals are stored in the same positional arrangement. Thus, it is possible to simplify a construction for an output device to switch between corresponding output signals of engines “C” and “D” in the later-described engine mirroring.

Then, on the basis of the patch settings of the respective patch sections 55, 56 and 57, the output devices “A”, “B” and “E” (first I/O device 4, console 1 and second I/O device 5) selectively take in, via a plurality of reception ports, output signals, required in the devices, from among the output signals of the active engine “C” written in the “C” region and output the taken-in signals to output terminals connected thereto (as indicated by upward solid-line arrows extending from the “C” region to the output devices “A”, “B” and “E”). In this manner, the output signals produced as a result of the signal processing by the active engine “C” are output via the output devices “A”, “B” and “E”. Note that the output signals of the passive engine “D” may be received at the same time, via other reception ports, in the output as indicated by upward broken-line arrows extending from the “D” region to the output devices “A”, “B” and “E”). In such a case, switching between the engines is effected by changing the path settings of the individual output terminals of the patch sections 55, 56 and 57 of the output devices “A”, “B” and “E” from the reception ports of the “C” region to corresponding reception ports of the “D” region.

<When the Active Engine is in an Abnormal State>

Once abnormality occurs to the active engine “C”, the patch settings (reception settings) of the patch sections 55, 56 and 57 are changed in the output devices “A”, “B” and “E”, so that the region of transmission channels that are take-in sources of output signals in the output devices “A”, “B” and “E” is switched from the “C” region to the “D” region. Namely, as shown in FIG. 7C, the output devices “A”, “B” and “E” selectively take in output signals, required in the devices, from among the output signals of the engine “D” written in the “D” region and output the taken-in signals to external output destinations connected thereto (as indicated by upward solid-line arrows extending from the “D” region to the output devices “A”, “B” and “E”). Here, an arrangement may be made to allow a plurality of receiving channels of each of the devices to be set on the basis of offsets from a common base channel; because the positional arrangement of a plurality of transmission channels having a plurality of output signals of the engine “C” and engine “D” stored therein is the same between the “C” region and the “D” region, it is possible to take in, from the “D” region, the same audio signals as those having so far been taken in from the “C” region, by just changing the base channel from the leading transmission channel of the “C” region to the leading transmission channel of the “D” region.

By the take-in source of output signals being switched from the “C” region to the “D” region in the output devices “A”, “B” and “E”, output signals produced as a result of the signal processing by the original passive engine “D” will be output via the output devices “A”, “B” and “E”. As a consequence, the original passive engine “D” will thereafter function as a passive engine. In FIG. 7C, the “D” region is hatched to indicate that the “D” region is a take-in source of output signals to be actually used. Note that the output signals of the engine “C” written in the “D” region may be received at the same time, via other reception ports, in the output devices “A”, “B” and “E” (as indicated by upward broken-line arrows extending from the “C” region to the output devices “A”, “B” and “E”). After that, the original active engine “C” will function as a passive engine.

Namely, in the “FAST” mode, it is possible to switch the engine to be used as the active engine (i.e., switch the main signal processing engine) by the output devices “A”, “B” and “E” selecting and outputting output signals of any one of the first engine 2 (engine “C”) and second engine 3 (engine “D”). Because the allocation of transmission channels to the first engine 2 (engine “C”) and second engine 3 (engine “D”) does not change in the course of the engine switching process, each of the engines 2 and 3 does not have to perform, among others, a process for changing the allocation of transmission channels. In addition, the output devices “A”, “B” and “E” only have to perform a simple process of switching the taken-in source of output signals. Therefore, in the “FAST” mode, it is possible to effect switching between the engines without involving almost no break in audio signal output from the output devices (sound break involved is of only several milliseconds or less).

<Automatic Switching Between the Engines (OSF Flags)>

Switching between the engines can be automatically effected according to a state of the active engine “C”. To realize such automatic switching between the engines, the active engine “C” and passive engine “D” in the instant embodiment output their respective OSF flags (i.e., first and second state data) each indicating whether the engine in question is in a normal state or in an abnormal state.

In FIGS. 7B and 7C, broken lines depicted along the horizontal bands, indicative of the “C” and “D” regions, show the OSF flags output by the engines “C” and “D”. Each of the engines “C” and “D” periodically checks whether its own operating state is normal or abnormal, and uses “CD Write Operation 86” of FIG. 5 to write the OSF flag, corresponding to the checked result, into the CD storage region 101 of a transmission frame. In the illustrated example, let it be assumed that the respective OSF flags of the two engines C and D are written into a common storage region (e.g., CD storage region 101).

All of the devices “A” to “F” in the mixing system can use “CD Take-in Operation 87” to take in the OSF flags, written into the transmission frame by the active engine “C” and passive engine “D”, and thereby detect respective operating states (“normal” or “abnormal”) of the active engine “C” and passive engine “D”. When the OSF flag of the active engine “C” indicates “abnormal (state)”, each of the output devices “A”, “B” and “E” can select and output the output signals of the passive engine “D” to thereby switch the engine to be used as the active engine (i.e., main signal processing engine in the mixing system). Namely, each of the output devices “A”, “B” and “E” can select and output the output signals of any one of the active engine “C” and passive engine “D” in accordance with the respective OSF flags of the engines C and D. The instant embodiment is not limited to the construction where both of the active engine “C” and passive engine “D” output the OSF flags, and only the active engine may output the OSF flag.

<Manual Switching Between the Engines>

The switching between the engines can be effected manually in response to an instruction by the human operator as well as automatically in response to the OSF flag(s). Namely, once the human operator inputs an engine switching instruction on the console 1 (device B), the console 1 writes an engine switching instruction (control data), addressed to all of the devices 1-6 (i.e., whose destination address is a broadcast address), into the Ethernet (registered trademark) data region 103 of a transmission frame. The output devices "A", "B" and "E" select and output output signals of any one of the active engine "C" and passive engine "D" in response to receipt of the engine switching instruction written in the transmission frame. Thus, the engine mirroring where the role of the main signal processing engine is switched from the active engine "C" to the passive engine "D" can be effected in response to the human operator's engine switching instruction as well. The engine switching instruction input by the human operator may be either an instruction for merely switching between the active engine "C" and the passive engine "D" or an instruction for designating an engine to be used as the active engine.

<Economy Mode>

Figure 8A:
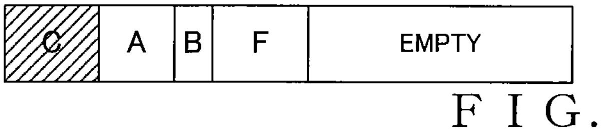
FIG. 8A is explanatory of characteristics of an ECONOMY mode, which is particularly explanatory of example allocation, to the individual devices, of transmission channels of the audio signal region of a transmission frame.
Figure 8B:
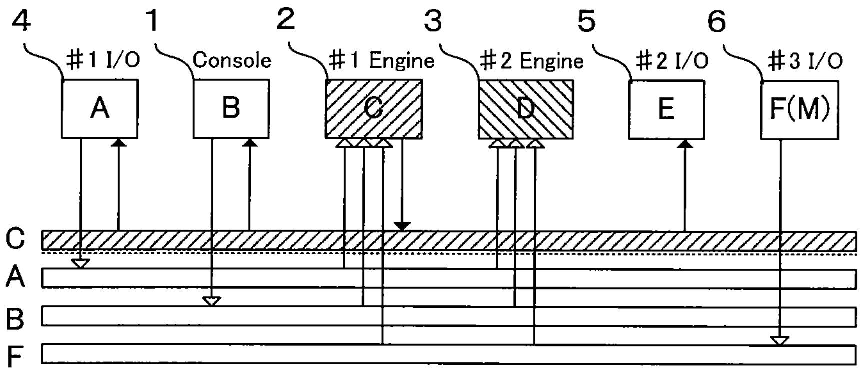
FIG. 8B is explanatory of characteristics of the ECONOMY mode, which is particularly explanatory of how audio signals (waveform data) are input and output when the active engine is in a normal state.
Figure 8C:
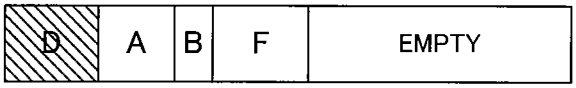
FIG. 8C is explanatory of characteristics of the ECONOMY mode, which is particularly explanatory of example allocation, to the individual devices, of transmission channels of the audio signal region of a transmission frame.
Figure 8D:
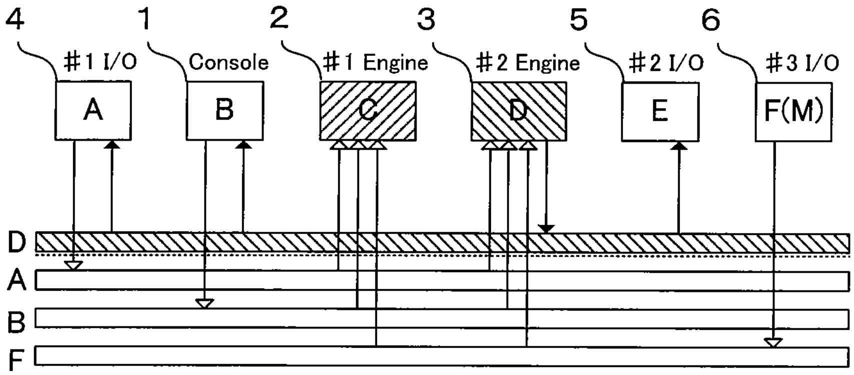
FIG. 8D is explanatory of characteristics of the ECONOMY mode, which is particularly explanatory of how audio signals (waveform data) are input and output when the active engine is in an abnormal state.

FIGS. 8A to 8D are diagrams explanatory of characteristics of the "ECONOMY mode". More specifically, FIG. 8A shows example allocation of the individual devices to the transmission channels of the audio signal region 102 of a transmission frame when the active engine "C" is operating normally, and FIG. 8B shows an example manner in which audio signals are transferred between the devices 1-6 when the active engine "C" is operating normally. Further, FIG. 8C shows example allocation of the individual devices to the transmission channels of the audio signal region 102 when abnormality has occurred to the active engine "C" (i.e., when the engine to be used as the main signal processing engine has been switched to the passive engine "D"), and FIG. 8D shows an example manner in which audio signals are transferred between the devices 1-6 when abnormality has occurred to the active engine "C".

<When the Active Engine is in a Normal State>

In the "FAST" mode, as set forth above, storage the "C" region and storage the "D" region, into which audio signals are to be written, are allocated in advance to the active engine "C" and passive engine "D", respectively. By contrast, in the "ECONOMY" mode, as shown in FIG. 8A, only the "C" region (hatched region in the figure) of the audio signal region 102 is allocated to the active engine "C", with no storage region of the audio signal region 102 allocated to the passive engine "D", as long as the active engine "C" is operating normally.

As shown in FIG. 8B, during normal operation of the active engine "C", the input devices "A", "B" and "F" (i.e., first I/O device 4, console 1 and third I/O device 6) write audio signals (input signals), input via a plurality of input terminals, into a plurality of transmission channels of the "A", "B" and "F" regions on the basis of their respective patch sections 50, 51 and 52 (as indicated by downward white-head arrows extending from the devices "A", "B" and "F" to the bands "A", "B" and "F"). Further, engines "C" and "D" (i.e., first and second engines 2 and 3), on the basis of patch settings of their respective patch sections 53, take in audio signals (input signals) from a plurality of transmission channels of the "A", "B" and "F" regions via a plurality of reception ports and supply the taken-in audio signals to a plurality of input channels (as indicated by upward white-head arrows extending from the bands "A", "B" and "F" to the devices "C" and "D").

The same patch settings are made for the respective output patch sections 54 of the engine "C" and engine "D". The active engine "C" performs signal processing on the taken-in input signals by means of the DSP section 35 and then writes, on the basis of the patch settings of the output patch section 54, the thus-processed audio signals of a plurality of output channels (output signals) into a plurality of transmission channels of the "C" region of a transmission frame. Although the passive engine "D" performs signal processing on the taken-in input signals by means of the DSP section 35, the patch settings are made invalid in the passive engine "D" because no region (transmission channels) is reserved for the passive engine "D" in the transmission frame; thus, the passive engine "D" does not perform a process for writing the processed audio signals of the plurality of output channels (output signals) into the transmission frame.

Then, on the basis of the patch settings of the respective patch sections 55, 56 and 57, the output devices "A", "B" and "E" (first I/O device 4, console 1 and second I/O device 5) selectively take in, via a plurality of reception ports, output signals, required in the devices, from among the output signals of the active engine "C" written in the "C" region and output the taken-in signals to output terminals connected thereto (as indicated by upward solid-line arrows extending from the "C" region to the output devices "A", "B" and "E"). In this manner, the output signals produced as a result of the signal processing by the active engine "C" are output via the output devices "A", "B" and "E".

<When the Active Engine is in an Abnormal State>

Once abnormality occurs to the active engine "C", the engine to be used as the main signal processing engine switches from the active engine "C" to the passive engine "D". In this case, the "C" region, having so far been allocated to the engine "C", is reallocated to the passive engine "D", as shown in FIG. 8C. Namely, the so-far (or original) active engine "C" invalidates the patch settings of the output patch section 54 to thereby prevent writing of audio signals into the "C" region and releases the "C" region that has so far been allocated thereto. Then, the engine "C" informs the master node (device "F") of the audio network 7 that the "C" region has been released. The so-far (i.e., original) passive engine "D", on the other hand, requests the master node for a storage region of the same size as the one having so far been reserved for the original active engine C, and, in response to an authorizing reply from the master node, it reserves the storage region of the predetermined size having been released by the original active engine C. Thus, the storage region having so far been allocated to the engine "C" is reallocated to the engine "D". As seen in FIG. 8C, the "D" region thus reallocated to the engine "D" is located at the same position, and has the same size, as the "C" region having so far been allocated to the engine "C" as shown in FIG. 8A.

As shown in FIG. 8D, the engine "D", having become a new active engine and having reserved the "D" region, validates the patch settings of the output patch section 54 to thereby start a process for writing audio signals of a plurality of channels, having been subjected to the signal processing by its own DSP section 35 (output signals), into a plurality of transmission channels of the "D" region allocated thereto (as indicated by a downward solid-line arrow extending from the engine "D" to the "D" region). On the basis of the patch settings of the patch sections 55, 56 and 57, the output devices "A", "B" and "E" selectively take in output signals, required in the devices, from among the output signals of the active engine "D" written in the "D" region and output the taken-in signals to a plurality of output terminals connected thereto (as indicated by upward arrows extending from the "D" region to the output devices "A", "B" and "E"). Because the "D" region allocated to the engine "D" is exactly identical to the "C" region previously allocated to the engine "C", the plurality of audio signals written in the "C" region and "D" region are the same in terms of the positional arrangement etc. Thus, each of the output devices "A", "B" and "E" can take in, from the "D"

region shown in FIG. 8D, the same audio signals as those having so far been taken in from the "C" region shown in FIG. 8B, without changing the patch settings of the patch section 55, 56 or 57 previously made before the engine switching.

In this manner, output signals produced as a result of the signal processing by the engine "D" having newly become the active engine are output via the output devices "A", "B" and "E". On the other hand, the engine "C" having become the passive engine does not write output signals, produced as a result of the signal processing thereby, into the transmission frame although it takes in input signals from the input devices "A", "B" and "F".

When the transmission channels having been set for reception have not been secured in any one of the devices (and hence no audio signals have been written into any one of the devices), the patch section 55, 56 or 57 of each of the output devices A, B and E invalidates the reception settings and path settings pertaining to the transmission channels and supplies silent signals to input channels connected thereto. Thus, external output of audio signals is automatically muted while the engine switching is being performed. Once the engine switching is completed, the muting is automatically canceled, so that the external output of audio signals is resumed. Namely, in the "ECONOMY" mode, the external output of audio signals is broken or interrupted during the engine switching (for several seconds to several tens of seconds).

In the "ECONOMY" mode, the engine to be used as the active engine (i.e., main signal processing engine in the mixing system) can be switched by the region, previously reserved by the original active engine C (first engine 2), being reallocated to the passive engine D (second engine 3). In the "ECONOMY" mode, where a storage region (transmission channels) of the audio signal region 102 is allocated only to the then-active engine instead of transmission channels of the audio signal region 102 being allocated to both of the two engines "C" and "D", it is possible to effect the engine mirroring without wasting the transmission channels of the audio signal region 102. In this case, the output of audio signals would undesirably break (i.e., sound break occurs) while the allocation of the transmission channels is changed; however, the advantageous benefit of saving the transmission channels is great if such a sound break is tolerable.

<Automatic Switching Between the Engines (OSF Flag)>

In the "ECONOMY" mode, OSF-responsive automatic switching between the engines is permitted if at least the active engine outputs the OSF flag. In FIG. 8B, the active engine "C" writes the OSF flag, indicative of its own operating state, into the CD region 101 of the transmission flame (as depicted by broken line along the "C" region in the figure). Once abnormality occurs to the active engine "C", the active engine "C" not only outputs the OSF flag indicative of the abnormality but also stops writing of audio signals to release the "C" region. Each of the output devices "A", "B" and "E" mutes external output of audio signals in response to receipt of the OSF flag indicative of the abnormality of the active engine "C". Also, in response to receipt of the OSF flag indicative of the abnormality of the active engine "C", the passive engine "D" reserves the region of the audio signal region 102 of a transmission frame, having so far been reserved by the active engine "C", once the region is released by the engine "C", and then it starts writing audio signals into the reserved region (see FIG. 8D). Then, the engine "D", as a new active engine, writes an OSF flag, indicative of its own operating state, into the CD region 101 of a transmission flame (as depicted by broken line along the "D" region in the figure). Each of the output devices "A", "B" and "E" cancels the muting of output of audio signals in response receipt of the OSF flag indicative of normality of the engine "D" and thereby starts outputting of output signals of the engine "D". In this way, it is possible to switch the engine to be used as the active engine (i.e., main signal processing engine in the mixing system), in response to the OSF flag. Whereas FIGS. 8B and 8D show an example construction where only the active engine outputs the OSF flag, the present invention is not so limited, and both of the active engine and the passive engine may output the OSF flags.

<Manual Switching Between the Engines>

The switching between the engines in the "ECONOMY" mode can be effected manually in response to an instruction by the human operator as well as automatically in response to the OSF flag(s). Namely, once the human operator inputs an engine switching instruction via the console 1 (device B), the console 1 writes an engine switching instruction (control data) into the Ethernet (registered trademark) data region 103 of a transmission frame. Thus, through operations similar to those in the automatic switching between the engines, the then-active engine not only stops writing audio signals but also releases the so-far allocated region, while the then-passive engine not only reserves a region but also starts writing of audio signals. Each of the output devices "A", "B" and "E" mutes external output of audio signals until the switching between the engines is completed and cancels the output muting upon completion of the switching between the engines. In this way, it is possible to switch the engine to be used as the active engine (i.e., main signal processing engine in the mixing system), in response to the OSF flag. The engine switching instruction input by the human operator may be either an instruction for merely switching between the active engine and the passive engine or an instruction for designating an engine to be used as the active engine.

<Mirroring Setting>

Figure 9:
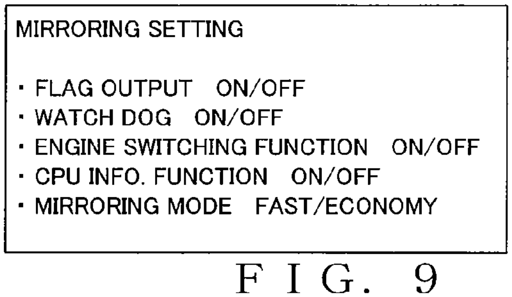
FIG. 9 is a diagram explanatory of examples of items to be set for engine mirroring.

The human operator of the mixing system can set a plurality of items, pertaining to the engine mirroring, via the console (control device) 1. Examples of the items related to the engine mirroring are listed in FIG. 9, which include: ON/OFF setting of an OSF flag output function for setting whether or not to output OSF flags from the engines; ON/OFF setting of a watch dog function for checking operation of the main CPU 30, which controls the engines, by means of the control microcomputer 45 of the network I/O; ON/OFF setting of an engine switching function (mirroring function); ON/OFF setting of a CPU information function for, by means of the control microcomputer 45 of the network I/O, informing another device of abnormality of the main CPU 30 and receiving such abnormality information from another device; and setting of a mirroring operation mode (i.e., FAST mode or ECONOMY mode)

FIGS. 10 to 20 are flow charts of processes performed in each of the devices through cooperation between the main CPUs 10, 20 or 30 and the control microcomputer 45 of the network I/O 33. Once the human operator sets any of the above-mentioned mirroring-related items, the console (control device) 1 writes the content of the set item (i.e., mirroring setting data) into a transmission frame to be transmitted to all of the devices connected to the mixing system. Each of the devices connected to the mixing system each takes in the mirroring setting data (ON/OFFs etc.) and perform processing required in that device in accordance with the content of the mirroring settings made by the human operator. Thus, the content of the mirroring settings made on the console 1 is reflected in each of the devices of the mixing system.

<Setting of the OSF Flag Output Function>

Figure 10:
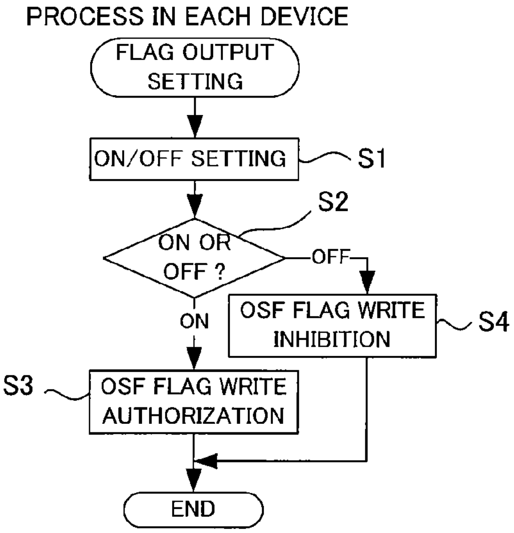
FIG. 10 is a flow chart showing a process performed by a control microcomputer of each of the devices in response to a flag output ON/OFF setting.

FIG. 10 is a flow chart showing a process performed through cooperation between the CPU 30 of each of the engines 2 and 3 and the control microcomputer 45 of the network I/O 33. This process is performed irrespective of whether the mirroring operation mode is the FAST mode or the ECONOMY mode.

Once the human operator changes the ON/OFF setting of the OSF flag output function via the console (control device) 1, the changed ON/OFF setting is written into a transmission frame under control of the CPU 10. The frame processing section 44 in the network I/O 33 of each of the engines 2 and 3 takes in the ON/OFF setting, written in the transmission frame, through "E Take-in Operation" 83. Then, the CPU 30 of each of the engines 2 and 3 writes the taken-in setting of the OSF flag output function into the RAM of the memory 31 and sends the setting of the OSF flag output function to the control microcomputer 45 (step S1). If the ON/OFF setting of the OSF flag output function is "ON" as determined at step S2, the control microcomputer 45 of the engine sets an OSF flag write authorization in the frame processing section 44 at step S3. If, on the other hand, the ON/OFF setting of the OSF flag output function is "OFF" as determined at step S2, the control microcomputer 45 of the engine sets an OSF flag write inhibition in the frame processing section 44 at step S4.

If the mirroring function is ON (i.e., the mirroring function is in operation), it means that the OSF flag is to be used, and thus, the OSF flag output function of each of the engines is necessarily set ON. The reason why the human operator or user is allowed to make an ON/OFF setting of the OSF flag output function is that the ON/OFF setting of the OSF flag output function is sometimes used for other purposes than the OSF flag output function. Thus, the user is allowed to set, as necessary, ON or OFF of the OSF flag output function as long as the mirroring function is OFF.

<Engine Switching in the FAST Mode>

The following describe processing related to the engine switching function in the FAST mode. The engine switching function in the FAST mode works when the ON/OFF setting of the engine switching function is ON and the mirroring mode is the FAST mode. The following description assumes a construction where both of the active engine and passive engine output the OSF flags.

<Operation Check Process in the Engine>

Figure 11:
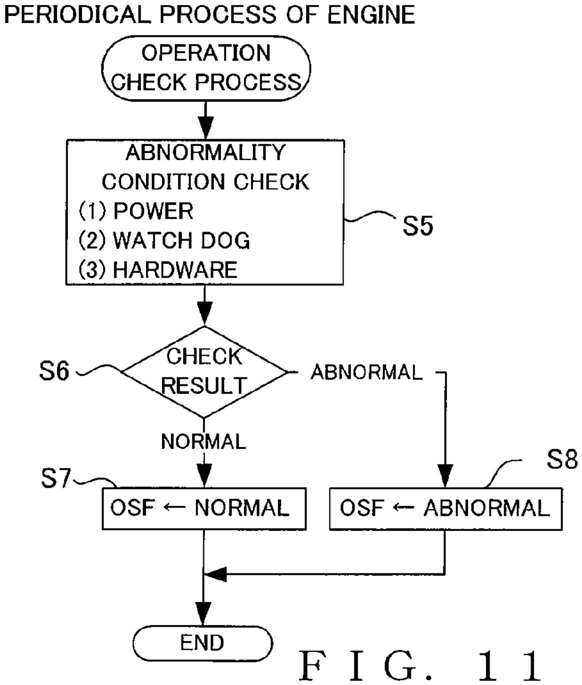
FIG. 11 is a flow chart showing a periodical operation check process performed by the control microcomputer of the engine when the engine switching is in the FAST mode.

FIG. 11 is a flow chart showing an example operational sequence of a periodical operation check process performed by the control microcomputer 45 of each of the engines when the engine switching function in the FAST mode is ON. This operation check process is performed in both of the active engine and passive engine.

At step S5, the control microcomputer 45 checks predetermined abnormality conditions to determine whether the operation of the engine is abnormal or normal. Of the predetermined abnormality conditions, "(1) Power" is for checking whether or not the power of the engine has been shut down by turning-off operation by the human operator, disconnection of a power cable, or the like. Note that the control microcomputer 45 of the network I/O 33 can continue to work even when the power has been shut down. "(2) Watch Dog" is for checking, through the aforementioned watch dog function, whether or not the main CPU 30 of the engine is operating in a normal state. If the watch dog function is currently OFF as a result of human operator's operation, this condition is not checked. Further, "(3) Hardware" is for checking errors of various hardware, such as hardware for providing communication between the audio I/O 32, DSP 35 and CPU 30 and the control microcomputer 45 in the engine. Here, the checks based on conditions (1) and (2) above are operations performed by the control microcomputer 45, while the check based on condition (3) above is an operation performed by the CPU 30. Results of the aforementioned checks are sent to the control microcomputer 45 for use in the microcomputer 45. The abnormality conditions listed above in relation to step S5 are just an illustrative example and may be any other suitable conditions.

At next step S6, the control microcomputer 45 determines that the engine is in an abnormal operating state if the result of at least one of the checks at step S5, based on the aforementioned abnormality conditions, indicates "abnormal (state)", and determines that the engine is in a normal operating state if the results of all of the checks based on the aforementioned abnormality conditions indicate "normal (state)". If the results of all of the checks, based on the aforementioned abnormality conditions, indicate "normal (state)" ("Normal" at step S6), the control microcomputer 45 sets the OSF flag at the value indicative of "normal". If, on the other hand, the result of at least one of the checks indicates "abnormal" ("Abnormal" at step S6), the control microcomputer 45 sets the OSF flag at the value indicative of "abnormal".

The frame processing section 44 of the engine writes the value of the OSF flag, set at step S7 or S8, into the CD region 101 of a transmission frame through "OSF Write Operation" 84, and then outputs the transmission frame. In this manner, the OSF flag corresponding to the operating state of the engine is transmitted to all of the devices 1 to 6 of the audio network 7, so that all of the devices 1 to 6 of the audio network 7 can know the operating state of the engine from the received OSF flag. "OSF Write Operation" 84 correspond to first and second state data write means (sections).

<Automatic Switching Between the Engines Responsive to the OSF Flag>

The switching between the engines in the "FAST" mode can be effected both automatically in response to the value of the OSF flag and in response human operator's manual operation. The following first describe the automatic switching between the engines responsive to the OSF flag.

<Flag Check Process in the Output Device>

Figure 12:
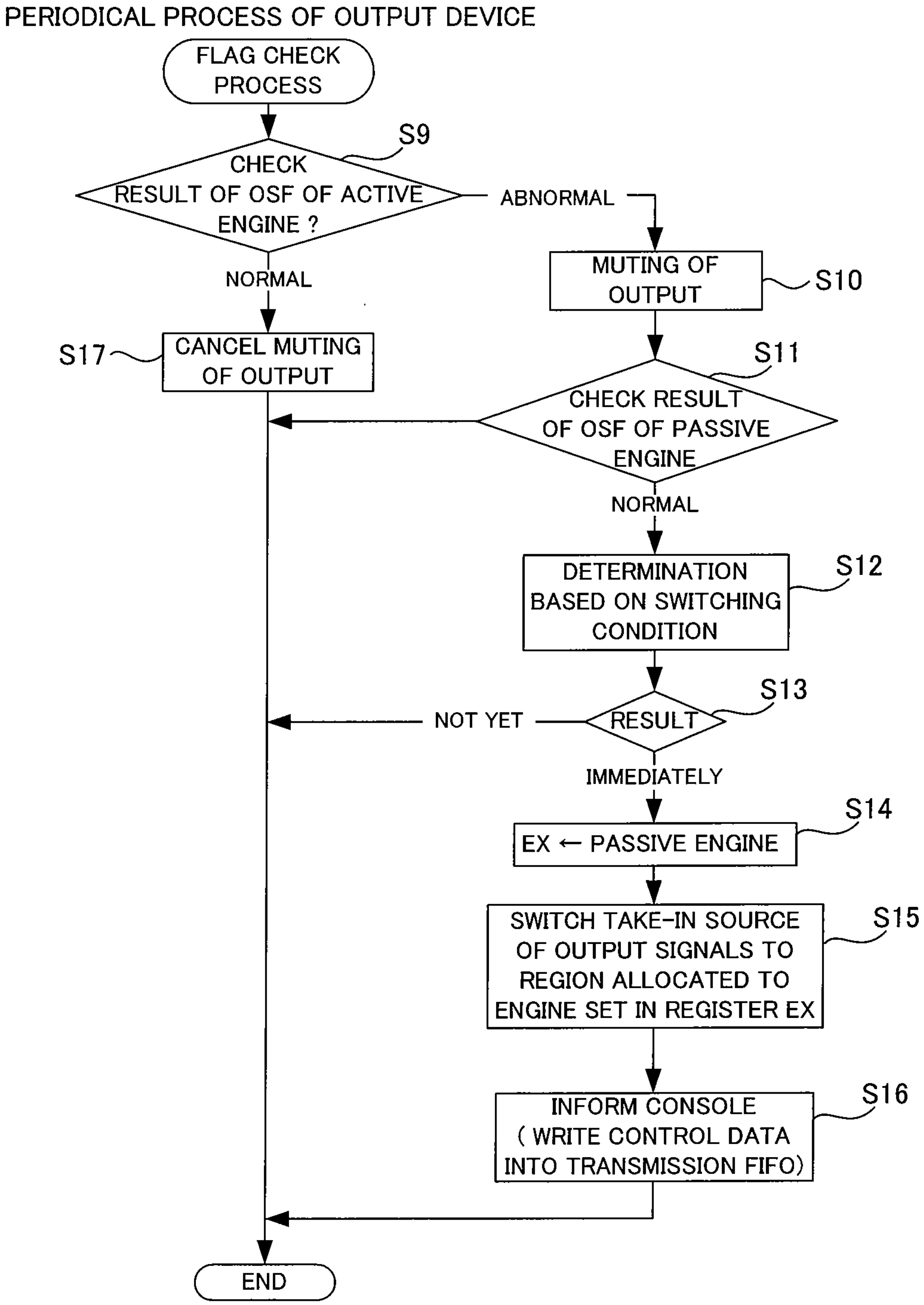
FIG. 12 is a flow chart showing a periodical flag check process performed by the control microcomputer of the output device when the engine switching is in the FAST mode.

FIG. 12 is a flow chart showing an example operational sequence of an OSF flag check process performed periodically by the control microcomputer 45 of each of the networks I/O 13 and 23 of the output devices 1, 4 and 5 while the "FAST" mode is set as the engine mirroring mode. While the mirroring function is ON, the OSF flag output function of each of the engines 2 and 3 is always ON, so that the periodic OSF flag check process of FIG. 12 is performed in each of the output devices.

In each of the networks I/O 13 and 23 of the output devices 1, 4 and 5, the control microcomputer 45 takes in, from the CD region 101 of the transmission frame, the OSF flag (first state data) of the active engine and the OSF flag (second state data) of the passive engine through "OSF Take-in Operation" 85. "OSF Take-in Operation" 85 corresponds to a first state data readout means (section). At step S9, the control microcomputer 45 checks the OSF flag of the active engine, so that, if the value of the OSF flag of the active engine indicates "abnormal" ("Abnormal" at step S9), the control microcomputer 45 branches to step S10. At and after steps S10, the control microcomputer 45 switches the taken-in source of output signals from the current active engine to the current passive engine, namely, switches the engine to be used in the mixing system from the active engine to the passive engine.

More specifically, at step S10, the control microcomputer 45 of each of the output devices invalidates the patch settings of the patch section 55, 56 or 57 to thereby perform a mute operation for muting output signals (output signals of the active engine) being currently output to the outside. The mute operation may comprise a conventionally-known operation, such as an operation for gradually decreasing output levels of the output signals, an operation for holding normal sample waveform data output at the last sampling period and outputting the thus-held normal sample waveform data or a combination of these operations. Note that the mute operation may be controlled by the main CPU 10 or 20.

At step S11, the control microcomputer 45 of the output device checks the OSF flag of the passive engine, read out by the frame processing section 44 through "OSF Take-in Operation" 85, so that, if the value of the OSF flag of the passive engine indicates "normal" ("Normal" at step S28), the control microcomputer 45 goes to step S12 to determine, on the basis of a predetermined engine switching condition, whether or not to effect switching between the engines. "OSF Take-in Operation" 85 for the passive engine corresponds to a second state data readout means (section).

The above-mentioned predetermined engine switching condition is a predetermined rule defining, for example, that the check of the OSF flag of the active engine at step S9 should be made a predetermined plurality of times. If that the check of the OSF flag of the active engine at step S9 should be made a predetermined plurality of times is set as the predetermined engine switching condition, an unnecessary engine switching operation can be avoided, for example, in a case where the active engine promptly returns to the normal operating state after the operating state of the active engine was temporarily determined to be abnormal due to some reason.

If the predetermined engine switching condition is not met as determined at step S12, step S13 branches to "Not Yet", so that the flag check process is brought to an end without performing operations at and after step S14 being performed at that time. Namely, even when the OSF flag of the active engine is indicating an "abnormal" operating state, the engine switching is not effected if the above-mentioned predetermined engine switching condition is not met; in such a case, a determination is made again, at next execution of the flag check process, as to whether or not to effect the engine switching.

If the predetermined engine switching condition is met and thus the engine switching is to be effected ("immediately" at step S13), then information identifying the passive engine that should become a switched-to engine is set into a register EX provided in a memory of the control microcomputer 45 (step S14). The engine thus set in the register EX becomes a new active engine. Then, at step S15, the control microcomputer 45 switches the take-in source of output signals (i.e., receiving channels set in the individual reception ports of the network I/O 13 or 23) to a region (transmission channels) allocated to the switched-to engine having been set in the register EX at step S14 above. Here, it is only necessary that the one base channel be changed. Then, the control microcomputer 45 informs the CPU 10 or 20 of the output device in question of the result of the engine switching, so that the CPU 10 or 20, having been informed of the result of the engine switching, not only stores the set information of the register EX into the RAM but also forms control data (Ethernet (registered trademark) frame) of the engine switching result. The thus-formed control data, which is addressed to the control device (console 1) etc., is written into the transmission FIFO 49 at step S16. The frame processing section 44 acquires the above-mentioned writing authorization or token and writes the control data into the Ethernet (registered trademark) data region 103 of a transmission frame, through "E Write Operation" 82.

If the OSF flag of the active engine is at the value indicative of "normal" as determined at step S9, the control microcomputer 45 of the output device goes to step S17, where it validates the patch settings of the patch section 55, 56 or 57 to cancel the muting of output signals (output muting). If the engine switching has been effected through the last (executed) flag check process, then the control microcomputer 45 cancels the muting of output signals (output muting), effected in the last process, after checking the OSF flag of the new active engine.

Thus, each of the output devices 1, 4 and 5 can take in the output signals written into a transmission frame by the engine having been newly set in the register EX (i.e., by the original passive engine) and output the taken-in output signals to the outside. Namely, through the operations of steps S9 to S15, the patch sections 55 to 57, including the network I/Os 13 and 23, each function as an output signal readout section. For example, in the case where the main signal processing engine is to be switched from the engine "C" to the engine "D", as shown in FIG. 7B and 7C, each of the output devices switches the take-in source of output signals from the "C" region of the audio signal region 102 of a transmission frame to the "D" region so that the output signals to be output from each of the output devices will switch from the output signals of the engine "C" to the output signals of the engine "D".

If it was determined, through the switching condition determination of step S12 in the last flag check process, that the engine switching should not yet be effected ("Not Yet" at step S13), and if the OSF flag of the active engine has returned to the value indicative of "normal" through the current flag check process, the output device cancels the output muting to thereby resume the external output of output signals.

<Manual switching Between the Engines>

The following describe processes performed when the human operator has given an engine switching instruction through manual operation while the FAST mode is set as the mirroring mode.

<Process in the Console>

Figure 13:
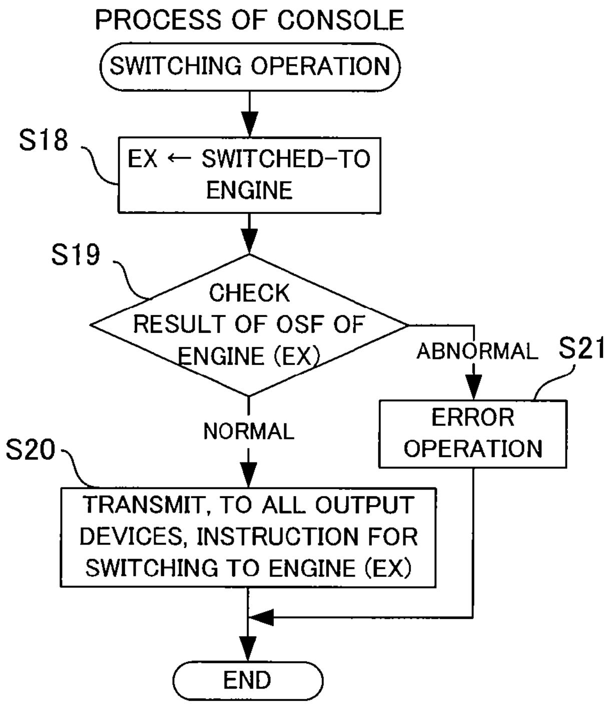
FIG. 13 is a flow chart showing a process performed by the control microcomputer of the console in response to engine switching operation by a human operator when the engine switching is in the FAST mode.

FIG. 13 is a flow chart of a process performed through cooperation between the CPU 10 of the console 1 and the control microcomputer 45 of the network I/O 13. The human operator performs engine switching operation by use of a user interface comprising the display section (P display) 15 and panel controls (P controls) 16 of the console 1. The engine switching operation may either be one that merely instructs switching between the active engine and the passive engine, or one that separately designates an engine to become a switched-to engine. Once the engine switching operation is detected, the main CPU 10 not only stores information indicative of the engine switching operation into the RAM of the memory 11 but also sends the information to the control microcomputer 45.

At step S18, the control microcomputer 45 sets, into the register EX, information identifying the engine designated as the switched-to engine through the engine switching operation. Then, the control microcomputer 45 checks the OSF flag of the switched-to engine, having been set in the register EX, and sends a result of the OSF flag check to the CPU 10 (step S19).

If the OSF flag of the switched-to engine (EX) is "normal" ("Normal" at step S19), the CPU 10 of the console 1 goes to step S20, where it transmits, to all of the output devices of the mixing system, an instruction (control data) instructing that switching be made to the engine (EX). Namely, through "E Write Operation" 82, the frame processing section 44 writes, into a transmission frame, an engine switching instruction addressed to all of the output devices and instructing that switching be made to the engine (EX), and then outputs the transmission frame. The reason why the engine switching instruction is addressed to all of the output devices at step S20 is that only the output devices require the engine switching instruction and thus the engine switching instruction only has to reach all of the output devices. Thus, the engine switching instruction may be transmitted with a broadcast address, and all of the devices in the mixing system may be arranged to receive the engine switching instruction.

If the OSF flag of the switched-to engine (EX) is "abnormal" ("Abnormal" at step S19), the CPU 10 of the console 1 goes to step S21 to perform a predetermined error operation, after which the process of FIG. 13 is brought to an end because, in this case, the main signal processing engine cannot be switched to another engine. The error operation may include, for example, an operation for displaying, on the display section (P display) 15, a warning to the effect that engine switching cannot be made now.

<Process in the Output Device>

Figure 14:
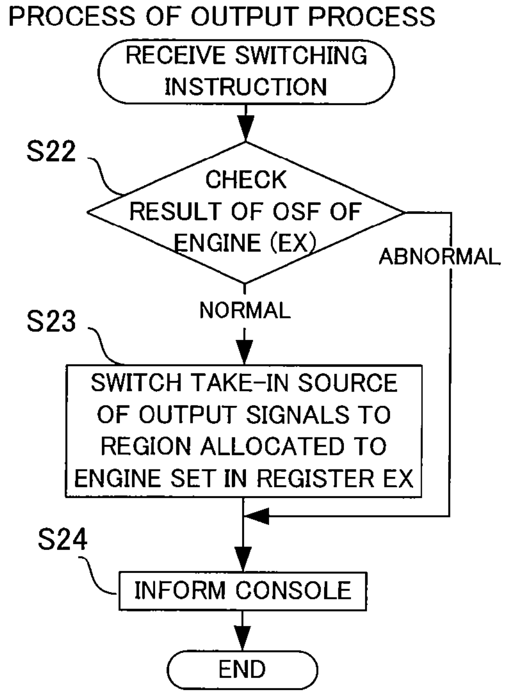
FIG. 14 is a flow chart showing a process performed by the control microcomputer of the output device upon receipt of an engine switching instruction responsive to engine switching operation by the human operator when the engine switching is in the FAST mode.

FIG. 14 is a flow chart showing a process performed through cooperation between the CPU 10 or 20 of each of the output devices 1, 4 and 5 and the control microcomputer 45 of each of the networks I/O 13 and 23 when the output device has received the engine switching instruction transmitted at step S21. Each of the CPUs 10 and 20, having received the engine switching instruction (control data) addressed to the output device in question, immediately sends the engine switching instruction to the control microcomputer 45.

At step S22, the control microcomputer 45 of the output device checks the OSF flag of the switched-to engine (EX) designated by the received engine switching instruction. If the OSF flag of the switched-to engine (EX) is "normal" ("Normal" at step S22), the control microcomputer 45 of the output device goes to step S23, where it switches the take-in source of output signals to a region (transmission channels) allocated to the switched-to engine designated by the received engine switching instruction. Thus, the frame processing section 44 of the output device comes to take in output signals of the switched-to engine (EX) through "A Take-in Operation" 81. If, on the other hand, the OSF flag of the switched-to engine (EX) is "abnormal" ("Abnormal" at step S22), the control microcomputer 45 of the output device goes to step S24.

At step S24, the control microcomputer 45 informs each of the CPUs 10 and 20 of results of the operations of steps S23 and S24, and each of the CPUs 10 and 20 forms, on the basis of the results of the operations of steps S23 and S24, a response to the engine switching instruction (i.e., control data indicative of whether or not engine switching could be made in accordance with the engine switching instruction) and then transmits the response to the console 1. Upon receipt of the response from the output device 1, the console 1 presents the received response to the human operator by displaying the received response on the display section (P display) 15. Thus, if engine switching could not be made, the console 1 can inform the human operator to that effect and wait for a next action to be taken.

According to the engine mirroring in the FAST mode, as set forth above, one or more necessary transmission channels are allocated in advance to each of the first and second engines 2 and 3 so that each of the first and second engines 2 and 3 writes audio signals (output signals) of one or more channels into the one or more transmission channels of a transmission frame, while each of the output devices 1, 4 and 5 takes in and outputs the output signals, written by the active engine (any one of the engines 2 and 3), from the transmission frame during normal operation. Once the OSF flag of the active engine indicates "abnormal", each of the output devices 1, 4 and 5 detects abnormality of the active engine and switches the take-in source of output signals from a storage region allocated to the active engine to a storage region allocated to the passive engine so that it takes in, from a transmission frame, output signals written by the passive engine (the other of the engines 2 and 3). In this way, it is possible to promptly effect the engine switching by merely changing or switching the take-in source of output signals in each of the output devices 1, 4 and 5. The instant embodiment can realize the engine mirroring function that involves almost no break in output signals (i.e., involves only a small sound break of several milliseconds or less).

Further, by the passive engine too being constructed to output the OSF flag, each of the output devices 1, 4 and 5 can also detect abnormality of the passive engine. Thus, even when switching between the engines is to be effected (e.g., when the active engine is in an abnormal operating state or when switching between the engines is instructed by the human operator), each of the output devices can also stop outputting output signals from the passive engine that becomes a switched-to engine, as long as the OSF flag of the passive engine indicates abnormality. In this way, it is possible to prevent non-normal audio signals from being output from the output devices.

Because the FAST mode employed in the instant embodiment allows engine switching (engine mirroring) to be effected without interrupting or breaking audio signals (i.e., without involving a substantive sound break), it is well suited for use in implementing the engine mirroring function in audio signal processing systems where output of audio signals is required to continue, such as mixing systems used in live concerts venues, music festival venues, various event venues, etc.

<Engine Switching in the ECONOMY Mode>

The following describe the engine switching function in the ECONOMY mode. The following describe processing related to the engine switching function in the ECONOMY mode. The engine switching function in the ECONOMY mode works when the ON/OFF setting of the engine switching function is ON and the mirroring mode is the ECONOMY mode. The following assumes a construction where both of the active engine and passive engine output the OSF flags.

<Operation Check Process in the Engine>

Figure 15:
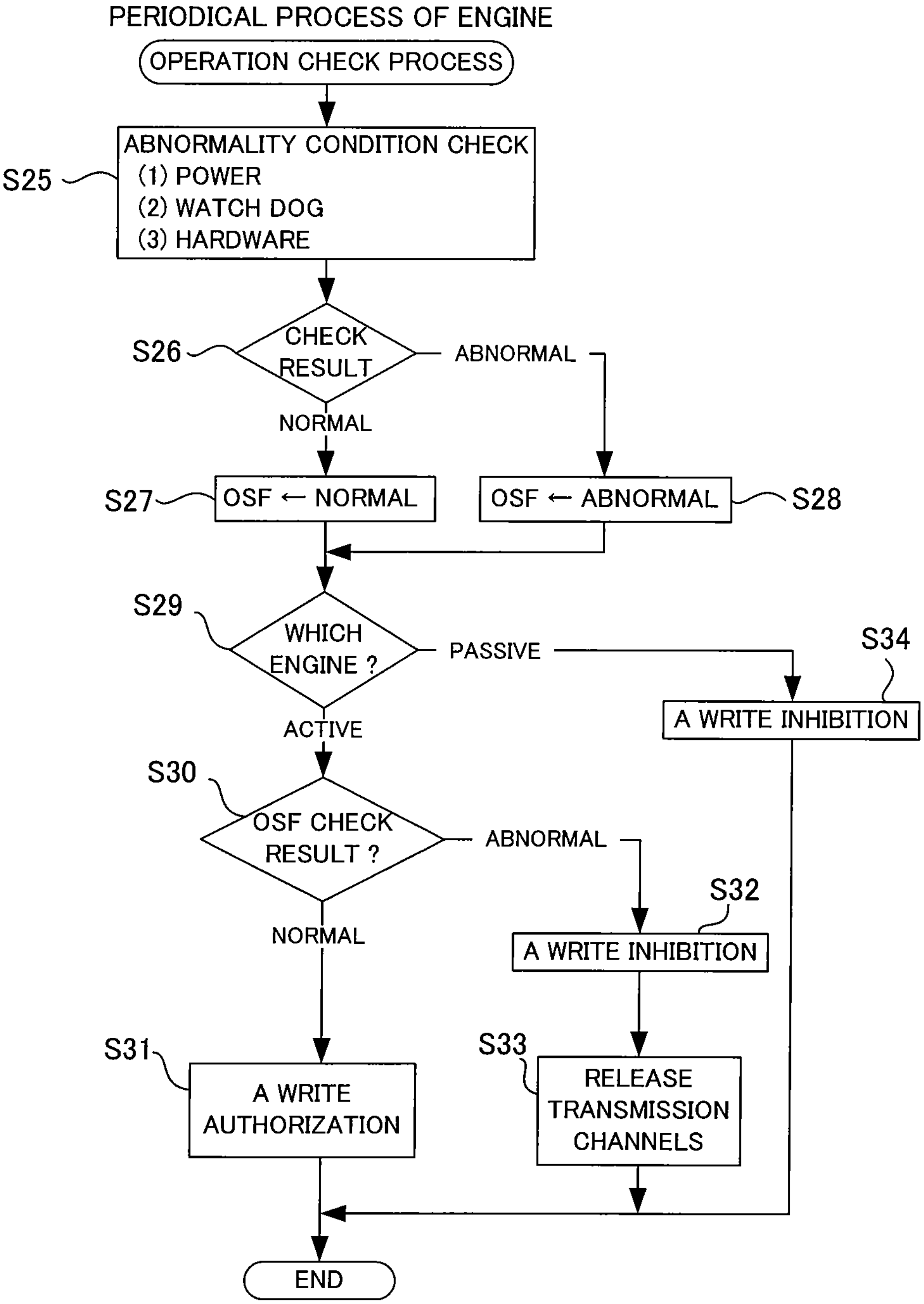
FIG. 15 is a flow chart showing a periodical operation check process performed by the control microcomputer of the engine when the engine switching is in the ECONOMY mode.

FIG. 15 is a flow chart showing an example operational sequence of a periodical operation check process performed by the engine control microcomputer 45 of the network I/O 33 of each of the engines when the engine switching function in the ECONOMY mode is ON. This operation check process is performed in both of the active engine and passive engine.

In the operation check process performed when the "ECONOMY" mode is ON, as shown in FIG. 15, operations for checking abnormality conditions and setting a value of the OSF flag in accordance with a result of the check are performed at steps S25 to S28 in the same manner as the operations of steps S5 to S8 in FIG. 11.

After a value of the OSF flag is set at step S27 or S28, the engine control microcomputer 45 performs an operation that differs depending on whether the engine in question is the active engine or the passive engine. If the engine in question is the active engine ("Active" at step S29), the engine control microcomputer 45 goes to step S30 to check the value of the OSF flag set at step S27 or S28. If the value of the OSF flag is indicative of "normal" ("Normal" at step S30), the engine control microcomputer 45 validates settings of transmission ports among the patch settings of the output patch section 54 and thereby authorizes the frame processing section 44 to write audio signals ("A Write Authorization" in the figure), at step S31.

If, on the other hand, the value of the OSF flag is indicative of "abnormal" ("Abnormal" at step S30), the engine control microcomputer 45 sets an audio signal write inhibition (depicted as "A Write Inhibition" in the figure) into the frame processing section 44 at step S32, and it performs an operation at step S33 for releasing all transmission channels (i.e., an entire region of the audio signal region 102) reserved by the engine in question. Through the operations of steps S32 and S33, the active engine stops working as the active engine, and the role of the active engine is switched over to the passive engine. The operations of steps S32 and S33 correspond to a control means (section).

If the engine performing the periodical process of FIG. 15 is the passive engine ("Passive" at step S29), the engine control microcomputer 45 branches to step S34, where it invalidates settings of transmission ports among the patch settings of the output patch section 54 and thereby sets an audio signal writing inhibition ("A Write Inhibition") into the output patch section 54. Because, in the ECONOMY mode, the passive engine has not secured or reserved transmission channels and does not output audio signals (see, for example, FIGS. 8A and 8B).

<Automatic Switching Between the Engines Responsive to the OSF Flags>

The switching between the engines in the "ECONOMY" mode can be effected both automatically in response to the values of the OSF flags and in response an engine switching instruction given by human operator's manual operation. The automatic switching between the engines responsive to the OSF flags is effected through flag check operations in the output devices and in the passive engine.

<Flag Check Process in the Output Device>

Figure 16:
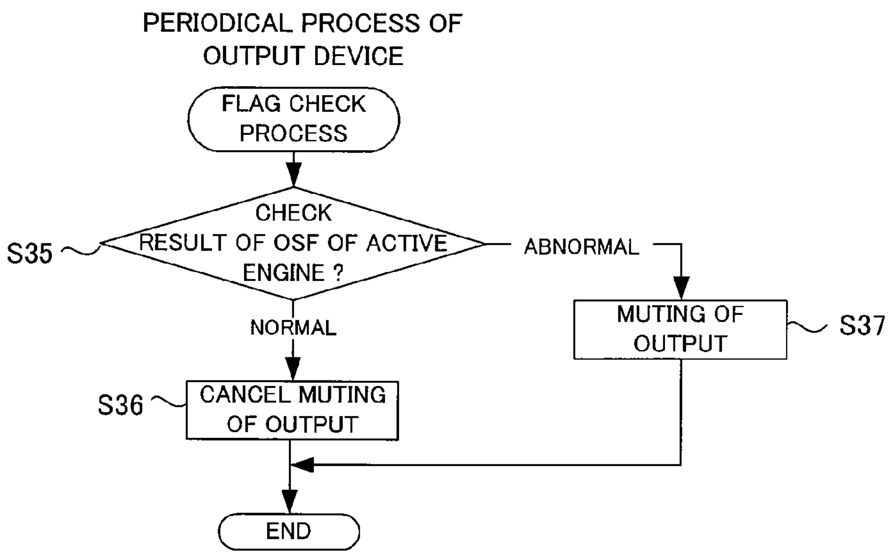
FIG. 16 is a flow chart showing a periodical flag check process performed by the control microcomputer of the output device when the engine switching is in the ECONOMY mode.

FIG. 16 is a flow chart showing an example operational sequence of an OSF flag check process performed periodically in each of the output devices 1, 4 and 5. While the engine switching function (engine mirroring function) is ON, the OSF flag output function of each of the engines 2 and 3 is always ON, so that the periodic process of FIG. 16 is performed in each of the output devices.

The frame processing section 44 of each of the network I/Os 13 and 23 of the output devices takes in the OSF flags from a transmission frame, through "OSF Take-in Operation" 85. The control microcomputer 45 of the network I/O 13 or 23 of each of the output devices checks the value of the OSF flag of the active engine of the taken-in OSF flags. If the value of the OSF flag of the active engine is indicative of "normal" ("Normal" at step S35), the control microcomputer 45 of the network I/O 13 or 23 of each of the output devices goes to step S36, where it validates the patch settings of the patch section 55, 56 or 57 to thereby perform an operation for canceling the output muting of output signals from the active engine. If, on the other hand, the value of the OSF flag of the active engine is indicative of "abnormal" ("Abnormal" at step S35), the control microcomputer 45 branches to step S37, where it invalidates the patch settings of the patch section 55, 56 or 57 to thereby perform an operation for muting output signals from the active engine. The muting operation performed here is similar in construction to the muting operation of step S10 shown in FIG. 12.

<Flag Check Process in the Passive Engine>

Figure 17:
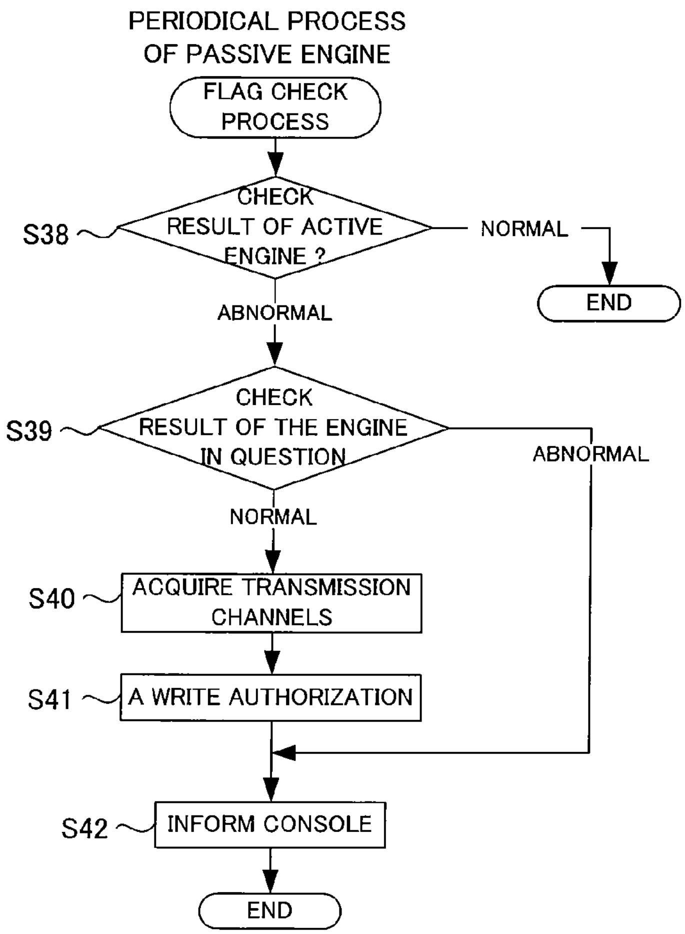
FIG. 17 is a flow chart showing a periodical flag check process performed by the control microcomputer of the passive engine when the engine switching is in the ECONOMY mode.

FIG. 17 is a flow chart showing an example operational sequence of an OSF flag check process performed periodically by the control microcomputer of the passive engine while the ECONOMY mode is set as the engine mirroring mode.

The frame processing section 44 of the network I/O 33 of the passive engine takes in the OSF flags from a transmission frame, through "OSF Take-in Operation" 85. Then, the control microcomputer 45 checks the value of the OSF flag of the active engine. If the value of the OSF flag of the active engine is indicative of "normal" ("Normal" at step S38), the OSF flag check process of FIG. 17 is brought to an end without performing further operations.

If, on the other hand, the value of the OSF flag of the active engine is indicative of "abnormal" ("Abnormal" at step S38), the control microcomputer goes to step S39, where it checks the OSF flag of the passive engine ("Engine in Question") and determines whether the engine in question (i.e., passive engine) is operating in a normal state. This is because the engine in question cannot replace the active engine unless it is in a normal state.

If the value of the OSF flag of the passive engine is indicative of "normal" ("Normal" at step S39), the control microcomputer 45 of the passive engine waits for release of the transmission channels of the active engine at step S33 of FIG. 15 and then reserves all of the released transmission channels, at step S40. Then, the control microcomputer 45 of the passive engine validates settings of transmission ports among the patch settings of the output patch section 54 and thereby authorizes the frame processing section 44 to write audio signals (waveform data) into the reserved transmission channels ("A Write Authorization" in the figure), at step S41. Through the operations of steps S40 and S41, the original passive engine starts outputting output signals and thereby switches to the role of a new active engine, and the output patch section 54, including the network I/O 33, functions as the second output signal write section.

Then, at step S42, the control microcomputer 45 informs the CPU 30 of the result of the aforementioned process, i.e. that the engine in question has been automatically switched from the role of the passive engine to the role of the active engine, in response to which the CPU 30 forms automatic switching information (control data) indicative of the automatic engine switching and transmits the thus-formed automatic switching information to the control device (console 1) by use of the frame processing section 44. If the OSF flag of the engine in question is indicative of "abnormal" ("Abnormal" at step S39), it means that the engine switching cannot be effected, so that the CPU 30 proceeds to step S42, without performing any operation, to transmit, to the console 1, switching failure information (control data) indicating that the engine switching could not be effected. Note that, if the transmission channels have not been released by the active engine within a predetermined time at step S40, an "error" determination may be made so that the process of FIG. 17 is ceased and this error is informed to the control device (console 1).

Through the processes of FIGS. 15 to 17, automatic engine switching responsive to the OSF flags can be effected. Namely, once abnormality occurs to the active engine, the active engine not only outputs the OSF flag indicative of "abnormal" (at step S28 of FIG. 15), but also stops writing of output signals (waveform data) into a transmission frame to release transmission channels (at steps S32 and S33 of FIG. 15). Through the process of FIG. 16, each of the output devices 1, 4 and 5 can detect an abnormal state of the active engine on the basis of the value of the OSF flag of the active engine, and, once abnormality occurs to the active engine, each of the output devices 1, 4 and 5 temporarily stops external output of output signals of the active engine. Further, the passive engine can detect an abnormal state of the active engine on the basis of the value of the OSF flag of the active engine, and, once abnormality occurs to the active engine, the passive engine acquires transmission channels and starts writing output signals (waveform data) (i.e., outputting of the output signals) into the acquired transmission channels (at steps S40 and S41 of FIG. 17). Once the original passive engine switches to a new active engine, each of the output devices 1, 4 and 5 cancels muting of output signals in response to the OSF flag indicative of "normal" output from the new active engine (at step S38 of FIG. 16). In this way, output signals of the new active engine are output from each of the output devices 1, 4 and 5.

<Manual switching Between the Engines>

The following describe processes performed when the human operator has given an engine switching instruction through manual operation while the ECONOMY mode is set as the mirroring mode.

<Process in the Console>

Figure 18:
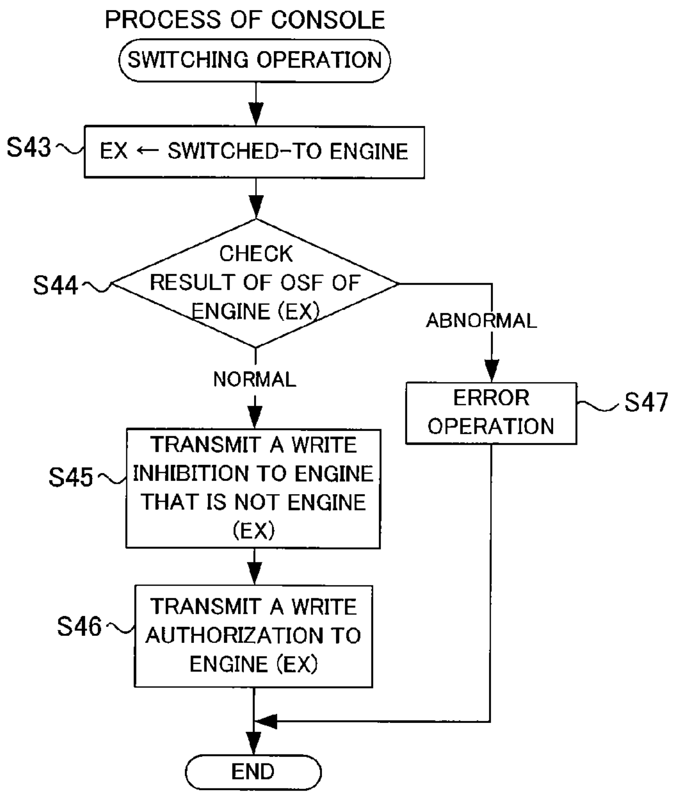
FIG. 18 is a flow chart showing a process performed by the control microcomputer of the console in response to engine switching operation by the human operator when the engine switching is in the ECONOMY mode.

FIG. 18 is a flow chart showing an example operational sequence of a process performed through cooperation between the CPU 10 of the console 1 and the control microcomputer 45 of the network I/O 13 in response to engine switching operation performed by the human operator via the console 1. In response to the human operator's engine switching operation, the CPU 10 informs the control microcomputer 45 of the engine switching operation detected thereby. In turn, the control microcomputer 45 sets, into the register EX, information identifying a switched-to engine at step S43 and then checks the value of the OSF flag being output by the switched-to engine (EX) at step S44 in the same manner as in the process in the FAST mode of FIG. 13.

If the OSF flag of the switched-to engine (EX) is indicative of "normal" ("Normal" at step S44), "A Write Inhibiting Instruction" (control data) that inhibits writing of audio signals into a transmission frame is transmitted, at step S45, to the engine (current active engine) that is not the switched-to engine (EX), while "A Write Authorizing Instruction" (control data) that inhibits writing of audio signals into a transmission frame is transmitted, at step S46, to the switched-to engine (EX) (current passive engine). Namely, the frame processing section 44 of the console 1 acquires the above-mentioned writing authorization or token, writes, into a transmission frame, "A Write Inhibiting Instruction" addressed to the active engine and "A Write Authorizing Instruction" addressed to the passive engine, and then outputs the transmission frame.

If the OSF flag of the switched-to engine (EX) is indicative of "abnormal", it means that the engine switching cannot be effected, and thus, a predetermined error operation is performed at step S47, after which the process of FIG. 18 is brought to an end. The error operation may include, for example, an operation for displaying, on the display section (P display) 15, a warning to the effect that engine switching cannot be made now.

<Process of the Active Engine>

Figure 19:
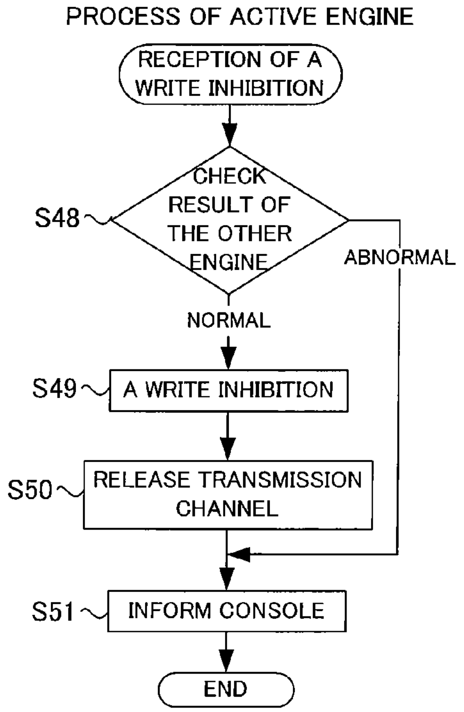
FIG. 19 is a flow chart showing a process performed by the control microcomputer of the active engine upon receipt of "A Write Inhibiting Instruction" responsive to engine switching operation by the human operator when the engine switching is in the ECONOMY mode.

FIG. 19 is a flow chart showing an example operational sequence of a process performed through cooperation between the CPU 30 and control microcomputer 45 of the active engine when "A Write Inhibiting Instruction" has been received by the frame processing section 44 of the active engine. The CPU 30 informs the control microcomputer 45 of the active engine of received "A Write Inhibiting Instruction" (control data). Then, the CPU 30 checks the value of the OSF flag of the other engine (passive engine) at step S48, and, if the value of the OSF flag of the other engine is indicative of "normal" ("Normal" at step S48), the CPU 30 goes to step S49. At step S49, the CPU 30 validates settings of transmission ports among the patch settings of the output patch section 54 and thereby sets an audio signal (output signal) writing inhibition ("A Write Inhibition") into the frame processing section 44 of the active engine. Then, at step S50, the control microcomputer 45 performs an operation for releasing all transmission channels (region in the audio signal region 102) reserved by the active engine. These operations of steps S49 and S50 are similar to the operations of steps S32 and S33 shown in FIG. 15. Through the operations of steps S49 and S50, the engine in question stops working as the active engine and switches to the role of the passive engine. Then, the CPU 30 stops outputting output signals (waveform data), forms a response (control data) indicating that it has released all the transmission channels having so far been reserved thereby, and sends the response to the console 1 (step S51).

According to the illustrated example of FIG. 19, if the value of the OSF flag of the other engine is indicative of "abnormal" ("abnormal" at step S48), the CPU 30 forms, at step S51, a response (control data), indicating that the engine in question continues to work as the active engine, without performing the operations of steps S49 and S50, and it transmits the thus-formed response to the control device (console 1) by use of the frame processing section 44. Alternatively, the "Abnormal" branch from step S48 may be dispensed with. Namely, the output stoppage of output signals at step S49 and the transmission channel release at step S50 may be performed irrespective of the value of the OSF flag of the other engine (i.e., passive engine).

<Process of the Passive Engine>

Figure 20:
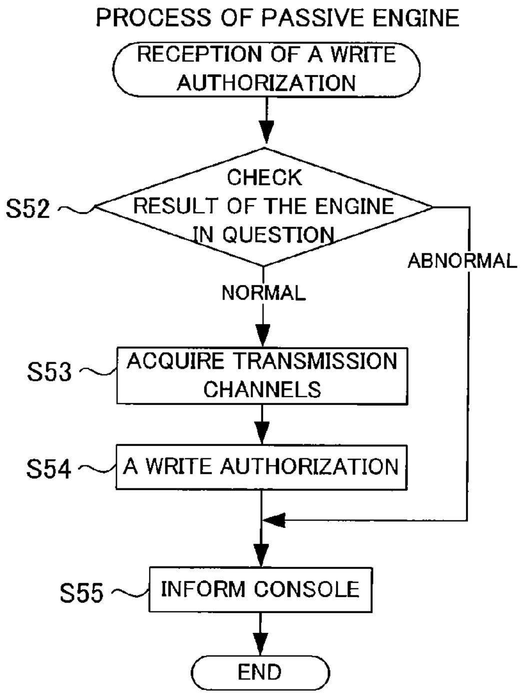
FIG. 20 is a flow chart showing a process performed by the control microcomputer of the passive engine upon receipt of "A Write Authorizing Instruction" responsive to engine switching operation by the human operator when the engine switching is in the ECONOMY mode.

FIG. 20 is a flow chart showing an example operational sequence of a process performed through cooperation between the CPU 30 and control microcomputer 45 of the passive engine when "A Write Authorizing Instruction" has been received by the frame processing section 44 of the passive engine. The CPU 30 informs the control microcomputer 45 of the passive engine of received "A Write authorizing Instruction" (control data). Then, the CPU 30 checks the value of the OSF flag of the engine in question (passive engine) at step S52, and, if the value of the OSF flag of the passive engine is indicative of "normal" ("Normal" at step S52), the CPU 30 waits for the active engine to perform the operation of step S50 of FIG. 19 to release the transmission channels and then reserves all of the released transmission channels (step S53). Then, the CPU 30 validates settings of transmission ports among the patch settings of the output patch section 54 and thereby sets, into the frame processing section 44, an authorization for writing audio signals (waveform data) into the reserved transmission channels ("A Write Authorization" in the figure) (step S54). Through the operations of steps S53 and S54, the original passive engine starts outputting output signals and thereby switches to a new active engine. Then, the CPU 30 forms a response (control data) indicating that the passive engine has reserved necessary transmission channels and started output signals (waveform data) and transmits the thus-formed response to the control device (console 1) by use of the frame processing section 44 (step S55).

If the value of the OSF flag of the passive engine is indicative of "abnormal" ("abnormal" at step S52), the CPU 30 forms a response (control data) indicating that engine switching will not be effected due to the abnormality of the passive engine, without performing the operations of steps S53 and S54, and transmits the thus-formed response to the control device (console 1) by use of the frame processing section 44 (step S55).

Through the processes of FIGS. 18 to 20, switching is made between the active engine and the passive engine in response to engine switching operation performed by the human operator via the console 1.

According to the engine mirroring in the ECONOMY mode, as set forth above, one or more transmission channels are allocated in advance only to any one of the first engine 2 and second engine 3, i.e. only to the active engine, and, once abnormality occurs to the active engine, all of the transmission channels allocated to the active engine are released and reallocated to the passive engine so as to effect switching between the engines. Namely, because one or more transmission channels are allocated to only any one of the two engines (then-active engine), it is possible to perform the engine mirroring function without wasting the transmission channels.

Further, with the arrangement that the passive engine detects abnormality of the active engine in accordance with the OSF flag, it is possible to save the time and number of processing steps necessary for the engine switching process, as compared to a conventionally-known method where a device other than the passive engine detects abnormality of the active engine and informs the passive engine of the abnormality.

Further, by the passive engine being also constructed to output the OSF flag, each of the output devices 1, 4 and 5 can detect abnormality of the passive engine as well. Thus, even when switching between the engines is to be effected (e.g., when the active engine is in an abnormal operating state or when switching between the engines is instructed by the human operator), each of the output devices can also stop outputting of output signals from the passive engine that becomes a switched-to engine, as long as the OSF flag of the passive engine indicates abnormality. In this way, it is possible to prevent non-normal audio signals from being output from the system.

Further, although the ECONOMY mode can achieve the engine mirroring function without wasting the transmission channels, it presents the inconvenience that output of audio signals would be broken during the engine switching (resulting in a sound break for several seconds to several tens of seconds) because the output devices 1, 4 and 5 stop outputting of output signals during the engine switching. Therefore, the above-described ECONOMY mode is well suited for use in implementing the engine mirroring function in audio signal processing systems where an accidental audio signal output interruption is tolerable, like those in public address systems, vocal guidance systems, etc.

Whereas FIG. 7A shows an example where the “C” region located at the leading end position of the audio signal region 102 is allocated to the active engine “C” while the “D” region located at trailing end position of the audio signal region 102 is allocated to the passive engine “D”, positions, in the audio signal region 102, of the regions to be allocated to the active engine “C” and passive engine “D” are not limited to those shown in the figure. Namely, the regions to be allocated to the active engine “C” and passive engine “D” may be reserved or secured anywhere in the audio signal region 102 as long as the regions of the same size can be secured. Similarly, in the ECONOMY mode shown in FIGS. 8A and 8C, the region to be allocated to the active engine may be secured anywhere in the audio signal region 102 without being limited to the leading end position of the audio signal region 102.

Further, according to the FAST mode described above in relation to FIG. 7A, the transmission channels into which the engine “C” writes audio signals and the transmission channels into which the engine “D” writes audio signals are disposed in the same (i.e., mutually identical) arrangement. However, the transmission channels into which the engine “C” writes audio signals and the transmission channels into which the engine “D” writes audio signals need not necessarily be disposed in the same arrangement, as long as the same number of audio signals are written into the respective transmission channels allocated to the engine “C” and engine “D”. In such a case, each of the output devices A, B and E has to individually reset a plurality of reception channels at the time of engine switching.

Further, according to the FAST mode described above, each of the output devices A, B and E is constructed to set, in the same number of reception ports as audio signals output by the output device, the transmission channels of the “C” region or “D” region as receiving channels. Alternatively, twice as many reception ports may be provided, and the transmission channels of the “C” region and “D” region may be set in the twice as many reception ports so that audio signals of the “C” region and “D” region are taken out in parallel with each other. In such a case, at the time of engine switching, each of the output devices can be switched from the output signals of one of the engines over to the output signals of the other engine in a cross-fade fashion.

As described above in relation to FIGS. 7 and 8, the successive regions (or transmission channels) in the audio signal region 102 are allocated to the individual devices. Alternatively, the regions (or transmission channels) to be allocated to the individual devices may be non-successive ones.

Whereas the embodiment of the present invention has been described above in relation to the case where the OSF flags (first state data and second state data) output by the active engine and passive engine are stored in the CD region 101, the OSF flags may be stored in any other suitable region than the CD region 101, such as the audio signal region 102. Further, the OSF flags output by the active engine and passive engine may be stored in different regions or locations rather than in the same region (e.g., CD region 101). For example, different ones of the transmission channels in the audio signal region 102 may be used to store therein the OSF flags output by the active engine and passive engine.

Furthermore, whereas the flow chart of FIG. 12 shows the process which is performed by each of the output devices and which is arranged to effect the engine switching when abnormality of the active engine has been confirmed a plurality of times through the OSF flag output by the active engine (steps S12 and S13), the process performed by each of the output devices may be arranged to effect the engine switching in response to first detection of abnormality of the active engine through the OSF flag.

Furthermore, the embodiment of the present invention has been described above in relation to the case where the active engine and the passive engine output their respective OSF flags (i.e., first state data and second state data). However, the OSF-flag-responsive engine mirroring can be effected in both of the FAST and ECONOMY modes as long as at least the active engine outputs the OSF flag. In the FAST mode in the case where only the active engine outputs the OSF flag, the periodic process of the output device shown in FIG. 12 proceeds to step S14, without performing the operations of steps S11 to S13, after branching to “abnormal” at step S9. Further, at the time of manual engine switching operation in the FAST mode, the operation of step S19 (i.e., OSF flag check in the console 1) shown in FIG. 13 and the operation of step S22 (i.e., OSF flag check in the output device) shown in FIG. 14 are not performed. Further, in the ECONOMY mode, the operation of step S39 (i.e., OSF flag check of the passive engine by the passive engine) shown in FIG. 17 is not performed. Furthermore, at the time of manual engine switching operation in the ECONOMY mode, the operation of step S48 (i.e., OSF flag check in the console 1) shown in FIG. 18 and the operation of step S22 (i.e., OSF flag check in the passive engine) shown in FIG. 20 are not performed.

Furthermore, the embodiment of the present invention has been described above in relation to the case where each of the devices 1 to 6 includes the CPU 10, 20 or 30 and the control microcomputer 45 and where the processes of FIGS. 10-20 etc. are performed through cooperation between the CPU 10, 20 or 30 and the control microcomputer 45. Alternatively, each of the processes of FIGS. 10-20 etc. may be performed singly by the CPU 10, 20 or 30.

Furthermore, whereas the two engines 2 and 3 are connected in adjoining relation to each other in the mixing system of FIG. 1, connection order of the individual devices in the audio network 7 is not limited to the one shown in the figures. The engine switching function employed in the above-described embodiment can be performed no matter which devices are connected to the audio network 7 and where in the audio network 7 the devices are connected.

Furthermore, the embodiment of the present invention has been described above in relation to the case where the input devices and the output devices comprise combined input/out devices 4, 5 and 6 having an audio signal input function and output function (i.e., devices each having an integral combination of input and an output devices having an audio signal input function and output function). Alternatively, the input device and the output device may comprise separate hardware devices.

The mixing system described above in relation to the embodiment can be advantageously used, for example, in concert venues, theaters, music production studios, public address systems, vocal guidance systems, etc. Further, the embodiment of the audio signal processing system of the present invention is not limited to the above-described mixing system. For example, the audio signal processing system of the present invention is applicable to intercommuication systems for performing audio communication between communication units each including a microphone and a audio system, effect impartment systems for imparting compressor, distortion and other effects to audio signals of guitars and vocals, reverberation support systems for picking up audio signals in a venue via a microphone to thereby generate reverberation supporting audio signals and output the reverberation supporting audio signals to the interior of the venue, plural-track recording/reproducing systems for simultaneously recording/reproducing a plurality of audio signals, etc.

The present application is based on, and claims priorities to, JP PA. 2009-171204 filed on Jul. 22, 2009 and JP PA. 2009-171205 filed on Jul. 22, 2009. The disclosure of the priority applications, in its entirety, including the drawings, claims, and the specification thereof, is incorporated herein by reference.

What is claimed is:

1. A audio signal processing system which includes a plurality of devices and an audio network interconnecting the plurality of devices and which, per predetermined period, circulates a transmission frame through the plurality of devices, the transmission frame having storage regions for storing therein various data to be communicated between the plurality of devices, each of the plurality of devices being capable of reading out data from some of the storage regions of the transmission frame or capable of writing data to some of the storage regions of the transmission frame, said plurality of devices including at least:

an input device including an input section that inputs audio signals from outside, and an input signal write section that writes the audio signals, input via said input section, into an audio signal storage region of the transmission frame as input signals to said audio signal processing system;

a first signal processing device including a first readout section that reads out the input signals from the audio signal storage region, a first signal processing section that performs signal processing on the input signals read out by said first readout section, a first output signal write section that writes the processed audio signals, from said first signal processing section, into the audio signal storage region of the transmission frame as first output signals, and a network interface that writes first state data, indicative of whether or not said first signal processing device is in a normal state, into a management data storage region of the transmission frame, the first state data being generated from the first signal processing device itself by checking whether its own operating state is normal or not;

a second signal processing device including a second readout section that reads out the input signals from the audio signal storage region, a second signal processing section that performs same signal processing as said first signal processing section on the input signals read out by said second readout section, and a second output signal write section that writes the processed audio signals, from said second signal processing section, into the audio signal storage region of the transmission frame as second output signals; and an output device including a network interface that reads out said first state data from the management data storage region, an output signal readout section that reads out said first output signals from the audio signal storage region when said first state data read out by said network interface is indicative of a normal state but reads out said second output signals from the audio signal storage region when the read-out first state data is indicative of an abnormal state, and an output section that outputs the audio signals, read out by said output signal readout section, to outside.

2. The audio signal processing system as claimed in claim 1, wherein said second signal processing device further includes a network interface that writes second state data, indicative of whether or not said second signal processing device is in a normal state, into the management data region of the transmission frame, the second state data being generated from the second signal processing device itself by checking whether its own operating state is normal or not, and said network interface of said output device further reads out said second state data from the management data storage region, wherein, when said first state data read out from the management data storage region is indicative of an abnormal state, said output device does not output said second output signals to outside as long as said second state data read out from the management data storage region is indicative of an abnormal state.

3. A audio signal processing system which includes a plurality of devices and an audio network interconnecting the plurality of devices and which, per predetermined period, circulates a transmission frame through the plurality of devices, the transmission frame having storage regions for storing therein various data to be communicated between the plurality of devices, each of the plurality of devices being capable of reading out data from some of the storage regions of the transmission frame or capable of writing data to some of the storage regions of the transmission frame, said plurality of devices including at least:

an input device including an input section that inputs audio signals from outside, and an input signal write section that writes the audio signals, input via said input section, into an audio signal storage region of the transmission frame as input signals to said audio signal processing system;

a first signal processing device including a first readout section that reads out the input signals from the audio signal storage region, a first signal processing section that performs signal processing on the input signals read out by said first readout section, and a first output signal write section that writes the processed audio signals, from said first signal processing section, into the audio signal storage region of the transmission frame as first output signals;

a second signal processing device including a second readout section that reads out the input signals from the audio signal storage region, a second signal processing section that performs same signal processing as said first signal processing section on the input signals read out by said second readout section, and a second output signal write section that writes the processed audio signals, from said second signal processing section, into the audio signal storage region of the transmission frame as second output signals;

a control device including an instruction input section operable by a human operator to input an instruction for switching between said first signal processing device and said second signal processing device, and a switching instruction write section that writes, into a data storage region of the transmission frame, a switching instruction corresponding to the instruction input via the instruction input section; and an output device including a switching instruction readout section that reads out the switching instruction from the data storage region, an output signal readout section that reads out said first output signals from the audio signal storage region before the switching instruction readout section reads out the switching instruction but reads out said second output signals from the audio signal storage region after the switching instruction readout section reads out the switching instruction, and an output section that outputs the audio signals, read out by said output signal readout section, to outside.

4. A audio signal processing system which includes a plurality of devices and an audio network interconnecting the plurality of devices and which, per predetermined period, circulates a transmission frame through the plurality of devices, the transmission frame having storage regions for storing therein various data to be communicated between the plurality of devices, each of the plurality of devices being capable of reading out data from some of the storage regions of the transmission frame or capable of writing data to some of the storage regions of the transmission frame, said plurality of devices including at least:

an input device including an input section that inputs audio signals from outside, and an input signal write section that writes the audio signals, input via said input section, into an audio signal storage region of the transmission frame as input signals to said audio signal processing system;

a first signal processing device including a first readout section that reads out the input signals from the audio signal storage region, a first signal processing section that performs signal processing on the input signals read out by said first readout section, a first output signal write section that writes the processed audio signals, from said first signal processing section, into the audio signal storage region of the transmission frame as first output signals, a network interface that writes first state data, indicative of whether or not said first signal processing device is in a normal state, into a management data storage region of the transmission frame, the first state data being generated from the first signal processing device itself by checking whether its own operating state is normal or not, and a control section that, when said first signal processing device is in an abnormal state, stops writing, into the audio signal storage region, of said first output signals to release the audio signal storage region;

a second signal processing device including a second readout section that reads out the input signals from the audio signal storage region, a second signal processing section that performs same signal processing as said first signal processing section on the input signals read out by said second readout section, a first state data readout section that reads out said first state data from the management data storage region, and a second output signal write section that, when said first state data read out by said first state data readout section is indicative of an abnormal state, acquires the audio signal storage region released by said control section and writes the processed audio signals, from said second signal processing section, into the acquired audio signal storage region as second output signals; and an output device including an output signal readout section that reads out said first output signals or said second output signals from the audio signal storage region, and an output section that outputs the audio signals, read out by said output signal readout section, to outside.

5. The audio signal processing system as claimed in claim 4, wherein said second signal processing device further includes a network interface that writes second state data, indicative of whether or not said second signal processing device is in a normal state, into the management data storage region, the second state data being generated from the second signal processing device itself by checking whether its own operating state is normal or not, and said output device further includes a network interface that reads out said first state data or said second state data from the management data storage region, wherein, when any one of said first state data and said second state data is indicative of an abnormal state, said output device does not output either of the first and second output signals to outside.

6. The audio signal processing system as claimed in claim 4, wherein said second signal processing device further includes a network interface that writes second state data, indicative of whether or not said second signal processing device is in a normal state, into the management data storage region of the transmission frame, the second state data being generated from the second signal processing device itself by checking whether its own operating state is normal or not, and said output device further includes a network interface that reads out said first state data and said second state data from the management data storage region, wherein, when each of said first state data and said second state data is indicative of an abnormal state, said output device does not output either of the first and second output signal to outside.

7. A audio signal processing system which includes a plurality of devices and an audio network interconnecting the plurality of devices and which, per predetermined period, circulates a transmission frame through the plurality of devices, the transmission frame having storage regions for storing therein various data to be communicated between the plurality of devices, each of the plurality of devices being capable of reading out data from some of the storage regions of the transmission frame or capable of writing data to some of the storage regions of the transmission frame, said plurality of devices including at least:

a control device including an instruction input section operable by a human operator to input an instruction for switching between signal processing devices, and a switching instruction write section that writes, into a data storage region of the transmission frame, an inhibiting instruction and an authorizing instruction in response to the instruction input via said instruction input section;

an input device including an input section that inputs audio signals from outside, and an input signal write section that writes the audio signals, input via said input section, into an audio signal storage region of the transmission frame as input signals to said audio signal processing system;

a first signal processing device including a first readout section that reads out the input signals from the audio signal storage region, a first signal processing section that performs signal processing on the input signals read out by said first readout section, a first output signal write section that writes the processed audio signals, from said first signal processing section, into the audio signal storage region of the transmission frame as first output signals, an inhibiting instruction readout section that reads out the inhibiting instruction from the data storage region, and a control section that, when the inhibiting instruction readout section reads out the inhibiting instruction, stops writing, into the audio signal storage region, of said first output signals to release the audio signal storage region;

a second signal processing device including a second readout section that reads out the input signals from the audio signal storage region, a second signal processing section that performs same signal processing as said first signal processing section on the input signals read out by said second readout section, an authorizing instruction readout section that reads out the authorizing instruction from the data storage region, and a second output signal write section that, when the authorizing instruction readout section reads out the authorizing instruction, acquires the audio signal storage region released by said control section and writes the processed audio signals, from said second signal processing section, into the acquired audio signal storage region as second output signals; and an output device including an output signal readout section that reads out said first output signals or said second output signals from the audio signal storage region, and an output section that outputs the audio signals, read out by said output signal readout section, to outside.

8. The audio signal processing system as claimed in claim 7, wherein said second signal processing device further includes a network interface that writes state data, indicative of whether said second signal processing device is in a normal state or in an abnormal state, into a management data storage region of the transmission frame, the stat data being generated from the second signal processing device itself by checking whether its own operating state is normal or not, and said control device further includes a network interface that reads out the state data from the management data storage region, wherein said switching instruction write section writes the inhibiting instruction and the authorizing instruction into the data storage region, in response to the instruction input via said instruction input section, when the state data is indicative of a normal state, but does not write the inhibiting instruction and the authorizing instruction, irrespective of the instruction input via said instruction input section, when the state data is indicative of an abnormal normal state.

9. The audio signal processing system as claimed in claim 7, wherein said second signal processing device further includes a network interface that writes state data, indicative of whether said second signal processing device is in a normal state or in an abnormal state, into a management data storage region of the transmission frame, the state data being generated from the second signal processing device itself by checking whether its own operating state is normal or not, and said first signal processing device further includes a network interface that reads out the state data from the management data storage region, wherein inside said first signal processing device, when the inhibiting instruction readout section reads out the inhibiting instruction, the control section stops writing, into the audio signal storage region, of said first output signals to release the audio signal storage region if the read-out state data is indicative of a normal state, and neither stops writing, into the audio signal storage region, of said first output signals nor releases the audio signal storage region if the read-out state data is indicative of an abnormal state.

10. The audio signal processing system as claimed in claim 7, wherein the second signal processing device generates state data by checking whether its own operating state is normal or not, and wherein, when the state data of said second signal processing device is indicative of a normal state, said second output signal write section of said second signal processing device acquires the audio signal storage region released by said control section in accordance with the given authorizing instruction and writes the processed audio signals, from said second signal processing section, into the acquired audio signal storage region as second output signals, while, when the state data of said second signal processing device is indicative of an abnormal state, said second output signal write section of said second signal processing device, irrespective of the output-signal-write authorizing instruction, neither acquires the audio signal storage region nor writes said second output signals.

* * * * *